United States Patent
Kumar et al.

(10) Patent No.: US 12,245,051 B2
(45) Date of Patent: Mar. 4, 2025

(54) DATA COLLECTION REPORTING FOR NON-TERRESTRIAL NETWORK CELLS

(71) Applicant: QUALCOMM Incorporated, San Diego, CA (US)

(72) Inventors: Rajeev Kumar, San Diego, CA (US); Bharat Shrestha, San Diego, CA (US); Alberto Rico Alvarino, San Diego, CA (US); Umesh Phuyal, San Diego, CA (US); Xipeng Zhu, San Diego, CA (US); Shankar Krishnan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 17/465,580

(22) Filed: Sep. 2, 2021

(65) Prior Publication Data
US 2023/0068504 A1    Mar. 2, 2023

(51) Int. Cl.
| | |
|---|---|
| *H04W 24/02* | (2009.01) |
| *H04B 7/185* | (2006.01) |
| *H04L 1/1812* | (2023.01) |
| *H04W 8/22* | (2009.01) |
| *H04W 8/24* | (2009.01) |
| *H04W 24/08* | (2009.01) |
| *H04W 24/10* | (2009.01) |
| *H04W 76/27* | (2018.01) |

(52) U.S. Cl.
CPC ........ *H04W 24/02* (2013.01); *H04B 7/18519* (2013.01); *H04L 1/1812* (2013.01); *H04W 8/22* (2013.01); *H04W 8/24* (2013.01); *H04W 24/08* (2013.01); *H04W 24/10* (2013.01); *H04W 76/27* (2018.02)

(58) Field of Classification Search
CPC ......... H04W 24/02; H04W 8/22; H04W 8/24; H04W 24/08; H04W 24/10; H04W 76/27; H04B 7/18519; H04L 1/1812
See application file for complete search history.

(56) References Cited

U.S. PATENT DOCUMENTS

| | | |
|---|---|---|
| 2013/0114446 A1 | 5/2013 | Liu et al. |
| 2020/0178204 A1 | 6/2020 | Chen et al. |

(Continued)

FOREIGN PATENT DOCUMENTS

| | | |
|---|---|---|
| WO | 2021120097 A1 | 6/2021 |
| WO | 2022050730 A1 | 3/2022 |

OTHER PUBLICATIONS

International Search Report and Written Opinion—PCT/US2022/042021—ISA/EPO—Dec. 15, 2022.

(Continued)

*Primary Examiner* — Brian S Roberts
(74) *Attorney, Agent, or Firm* — Patterson + Sheridan, L.L.P.

(57) ABSTRACT

Certain aspects of the present disclosure provide techniques for data collection for non-terrestrial networks (NTN). One aspect provides a method for wireless communications by a user equipment (UE). The method generally includes transmitting an indication of a capability of the UE to connect to a network via both terrestrial network (TN) cells and non-terrestrial network (NTN) cells and transmitting one or more data collection reports in accordance with the indicated capability.

13 Claims, 17 Drawing Sheets

(56) References Cited

U.S. PATENT DOCUMENTS

| | | | |
|---|---|---|---|
| 2020/0313795 A1* | 10/2020 | Xu | H04B 7/0632 |
| 2020/0314737 A1 | 10/2020 | Godin et al. | |
| 2021/0105693 A1 | 4/2021 | Tripathi et al. | |
| 2021/0297923 A1* | 9/2021 | Wei | H04W 36/0088 |
| 2021/0360449 A1 | 11/2021 | Kim et al. | |
| 2022/0015157 A1 | 1/2022 | Yang et al. | |
| 2022/0070738 A1* | 3/2022 | Tripathi | H04W 28/24 |
| 2022/0078684 A1 | 3/2022 | Fehrenbach et al. | |
| 2022/0086713 A1 | 3/2022 | Määttänen et al. | |
| 2022/0150806 A1 | 5/2022 | Tripathi et al. | |
| 2022/0167257 A1* | 5/2022 | Geng | H04W 48/16 |
| 2022/0210703 A1* | 6/2022 | Yu | H04W 36/0094 |
| 2022/0225181 A1 | 7/2022 | Kovacs et al. | |
| 2022/0322449 A1 | 10/2022 | Shah et al. | |
| 2022/0330323 A1 | 10/2022 | Kim et al. | |
| 2022/0330339 A1 | 10/2022 | Siomina et al. | |
| 2022/0330347 A1* | 10/2022 | You | H04B 7/18513 |
| 2022/0400415 A1 | 12/2022 | Xie et al. | |
| 2023/0040263 A1 | 2/2023 | Zhang | |
| 2023/0060250 A1 | 3/2023 | Kumar et al. | |
| 2023/0061624 A1 | 3/2023 | Kumar et al. | |
| 2023/0077862 A1* | 3/2023 | You | H04B 17/318 370/252 |
| 2023/0100878 A1 | 3/2023 | Zhang | |
| 2023/0132815 A1* | 5/2023 | Wu | H04W 24/10 370/329 |
| 2023/0254794 A1 | 8/2023 | Park et al. | |
| 2023/0262590 A1 | 8/2023 | Määttänen et al. | |
| 2023/0308958 A1* | 9/2023 | Dong | H04W 36/0058 |
| 2023/0319606 A1 | 10/2023 | Bergström et al. | |
| 2024/0022972 A1 | 1/2024 | Yavuz et al. | |
| 2024/0049206 A1 | 2/2024 | Hévizi et al. | |
| 2024/0107355 A1* | 3/2024 | Hofmann | H04B 7/18541 |

OTHER PUBLICATIONS

Qualcomm Incorporated: "Scope of RAN Data Collection Enhancements", 3GPP TSG RAN Meeting #85, RP-192003, 3rd Generation Partnership Project (3GPP), Mobile Competence Centre, 650, Route Des Lucioles, F-06921 Sophia-Antipolis Cedex, France, vol. TSG RAN, No. Newport Beach, USA, Sep. 16, 2019-Sep. 20, 2019, 3 Pages, Sep. 9, 2019 (Sep. 9, 2019), XP051782561, the whole document.

ZTE: "Email Discussion Summary for [RAN-R18-WS-eMBB-ZTE]", 3GPP TSG RAN REL-18 Workshop, RWS-210548, 3rd Generation Partnership Project (3GPP), Mobile Competence Centre, 650, Route Des Lucioles, F-06921 Sophia-Antipolis Cedex, France, vol. RAN WG3, No. e-Meeting, Jun. 28, 2021-Jul. 2, 2021, 35 Pages, Jun. 25, 2021 (Jun. 25, 2021), XP052029021, paragraph [03.3]—paragraph [0004].

Nokia, et al., "Report from [Post112-e][153][NTN] Idle mode aspects (Nokia)", 3GPP TSG-RAN WG2 Meeting #113, R2-20xxxxx, Elbonia, Online, Jan. 25-Feb. 5, 2021, 15 Pages.

\* cited by examiner

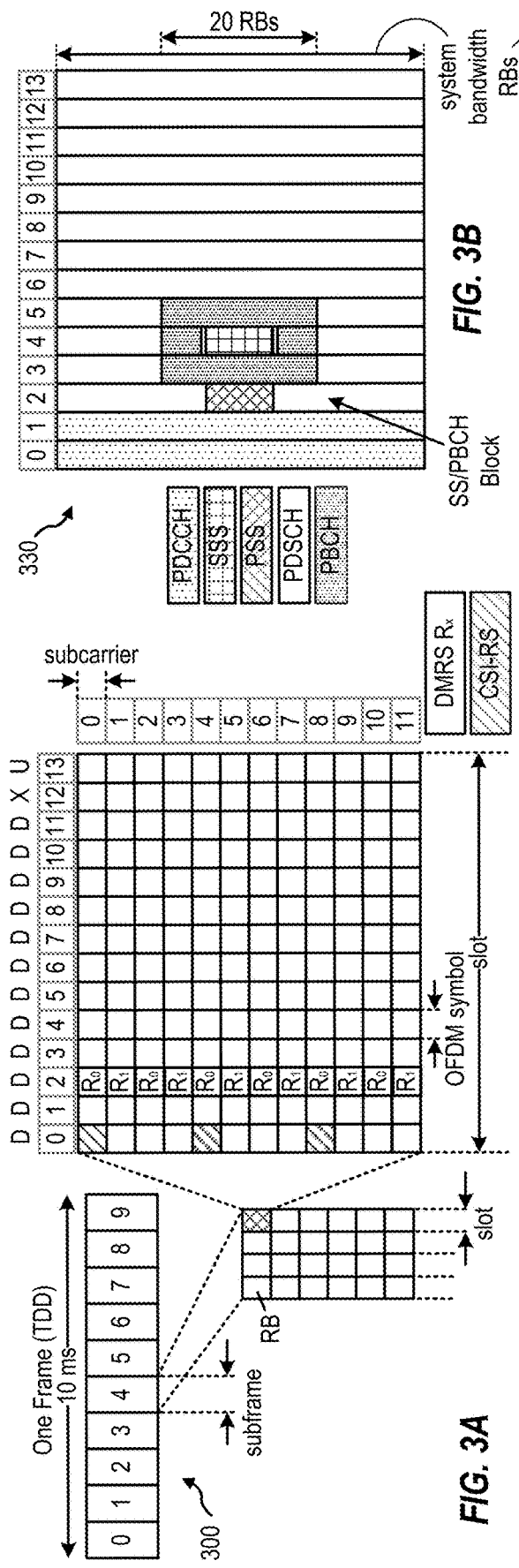
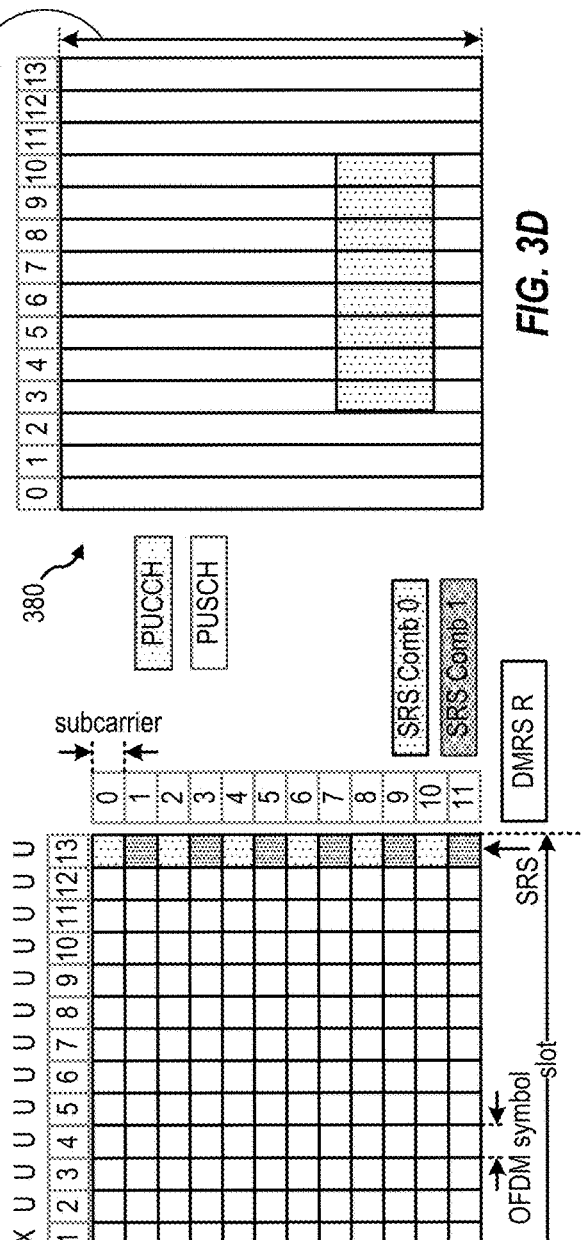
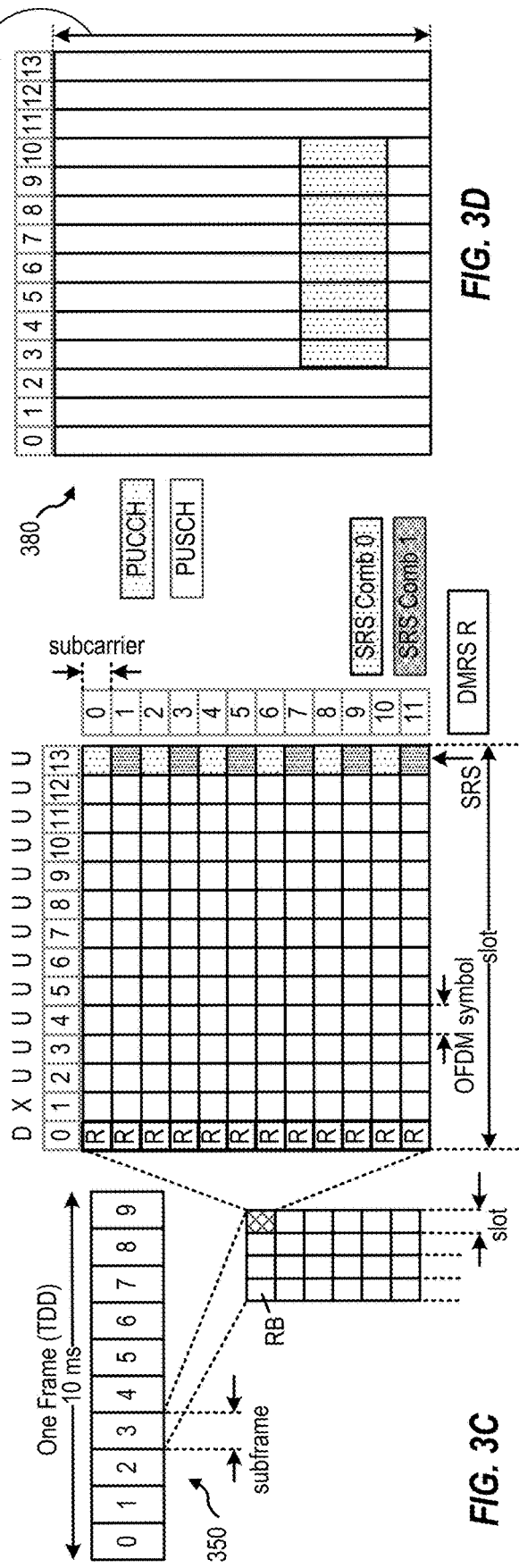
FIG. 3A
FIG. 3B
FIG. 3C
FIG. 3D

US 12,245,051 B2

DATA COLLECTION REPORTING FOR NON-TERRESTRIAL NETWORK CELLS

INTRODUCTION

Aspects of the present disclosure relate to wireless communications, and more particularly, to techniques for data collection reporting in non-terrestrial networks (NTNs).

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

In one aspect, a method for wireless communications by a user equipment (UE) includes transmitting an indication of a capability of the UE to connect to a network via both terrestrial network (TN) cells and non-terrestrial network (NTN) cells; and transmitting one or more data collection reports in accordance with the indicated capability.

In one aspect, a method for wireless communications by a network entity includes receiving, from a UE, an indication of a capability of the UE to connect to a network via both TN cells and NTN cells; and receiving one or more data collection reports from the UE in accordance with the indicated capability.

In one aspect, a method for wireless communications by a UE includes taking measurements for one or more TN cells and one or more NTN cells; and transmitting a report, upon detecting a failure, that includes measurements for at least one of the TN cells or the NTN cells.

In one aspect, a method for wireless communications by a network entity includes communicating with a UE capable of connecting to a network via both TN cells and a NTN cells; and receiving, from the UE, a report that indicates the UE detected a failure and includes measurements for at least one of the TN cells or the NTN cells.

In one aspect, a method for wireless communications by a wireless node includes generating at least one data collection report for network cell self-optimization and for Quality of Service (QoS) verification while the UE is capable of connecting to a network via both TN cells and NTN cells and transmitting the data collection report.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for data collection reporting for NTNs.

For example, aspects of the present disclosure may provide enhanced mechanisms for a UE, capable of connecting to both TN and NTN networks, to collect and report various types of data. Such reports may include reports used for self-organizing networks (SON) and minimization of driving test (MDT) reports, with information tailored for NTN.

In some cases, data collection reporting mechanism for TNs may be leveraged to provide additional information beneficial to optimizing performance of various procedures for NTNs.

Introduction to Wireless Communication Networks

Figure 1:
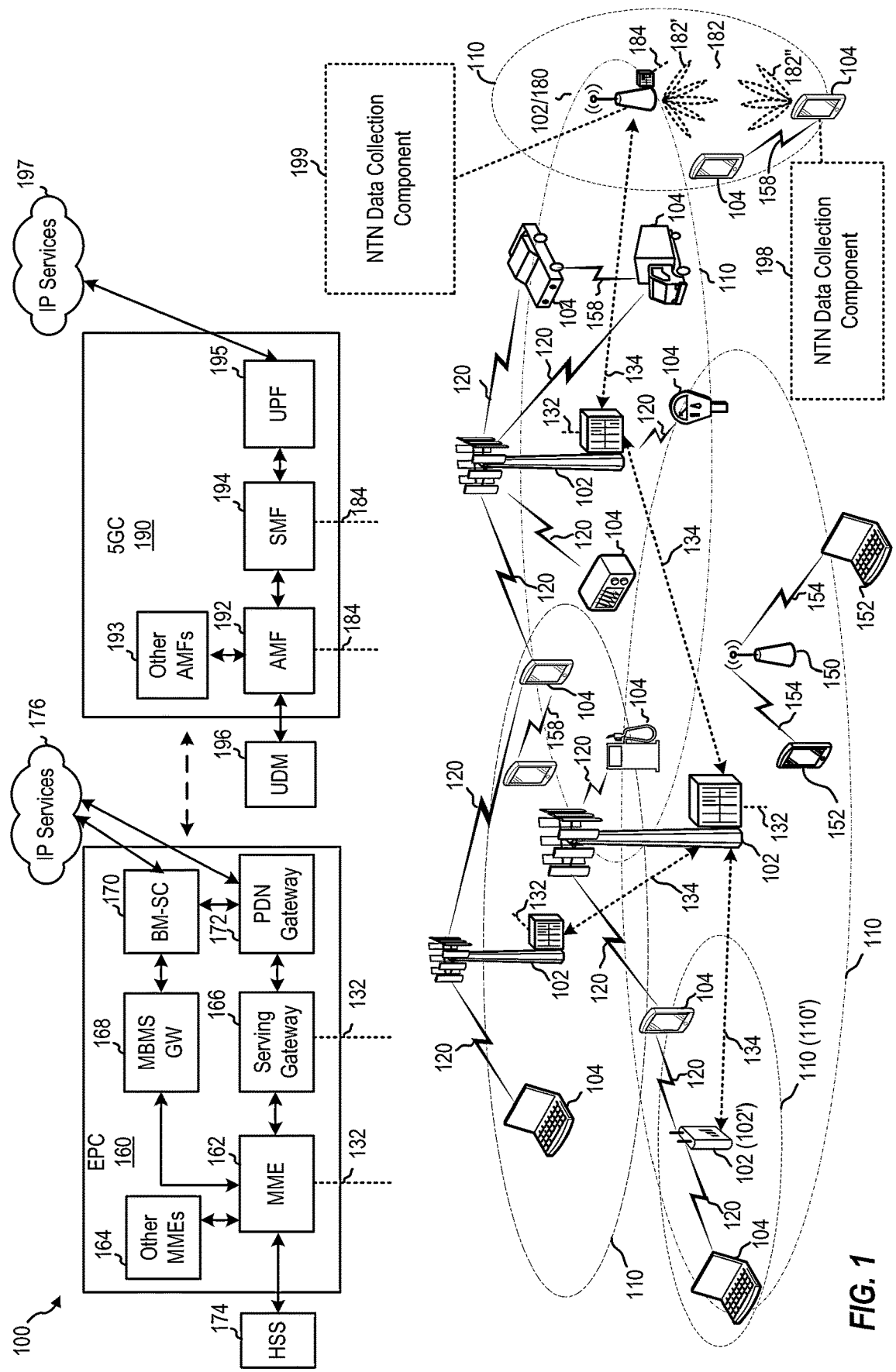
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes NTN data collection component 199, which may be configured to perform various operations described herein for collecting and reporting data for NTN. Wireless network 100 further includes NTN data collection component 198, which may be used configured to perform various operations described herein for processing data collected and reported for NTN.

Figure 2:
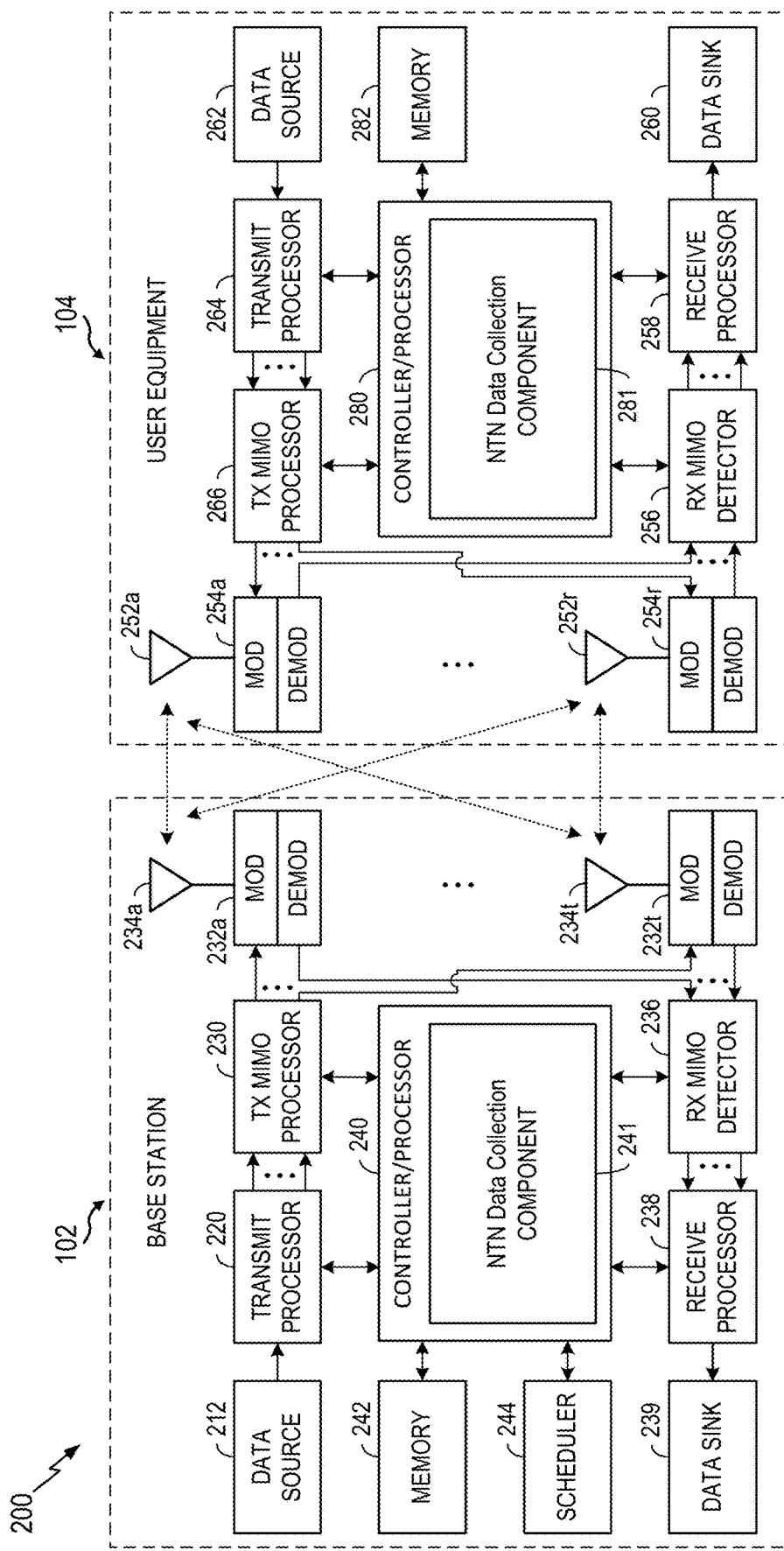
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes collecting and reporting data for NTN 241, which may be representative of collecting and reporting data for NTN 199 of FIG. 1. Notably, while depicted as an aspect of controller/processor 240, collecting and reporting data for NTN 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes collecting and reporting data for NTN 281, which may be representative of collecting and reporting data for NTN 198 of FIG. 1. Notably, while depicted as an aspect of controller/processor 280, collecting and reporting data for NTN 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Aspects Related to Non-Terrestrial Network

A non-terrestrial network (NTN) generally refers to a network, or segment of networks using RF resources on board a satellite. NTN signaling could be regenerative (with on-board NTN processing) or transparent (e.g., so called bent pipe where the satellite sends back to Earth what it receives with only amplification and a shift from uplink to downlink frequency).

Figure 4:
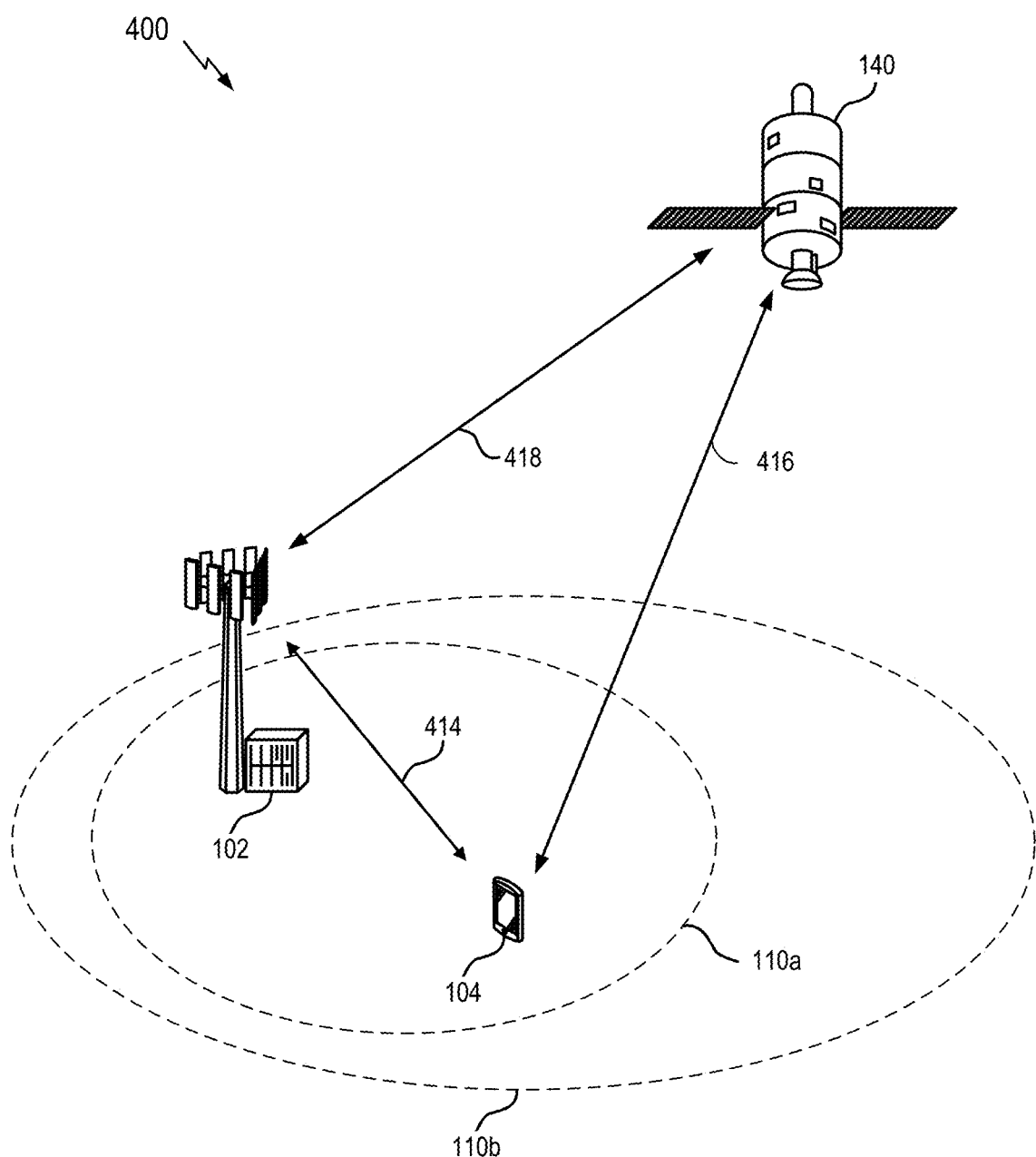
FIG. 4 depicts an example non-terrestrial network (NTN).

FIG. 4 illustrates an example of a wireless communications network 400 including a non-terrestrial network (NTN) entity 140 (which may be generally referred to as NTN 140), in which aspects of the present disclosure may be practiced. In some examples, the wireless communications network 400 may implement aspects of the wireless communication network 100. For example, the wireless communications network 400 may include BS 102, UE 104, and the non-terrestrial network entity 140, such as a satellite. BS 102 may serve a coverage area or cell 110a in cases of a terrestrial network, and non-terrestrial network entity 140 may serve the coverage area 110b in cases of a non-terrestrial network (NTN). Some NTNs may employ airborne platforms (e.g., a drone or balloon) and/or spaceborne platforms (e.g., a satellite).

The non-terrestrial network entity 140 may communicate with the BS 102 and UE 104 as part of wireless communications in an NTN. In cases of a terrestrial network, the UE 104 may communicate with the BS 102 over a communication link 414. In the case of NTN wireless communications, the non-terrestrial network entity 140 may be a serving cell for the UE 104 via a communication link 416. In certain aspects, the non-terrestrial network entity 140 may act as a relay (or a remote radio head) for the BS 102 and the UE 104. For example, the BS 102 may communicate with the non-terrestrial network entity 140 via a communication link 418, and the non-terrestrial network entity may relay signaling between the BS 102 and UE 104 via the communication links 416, 418.

Figure 5A:
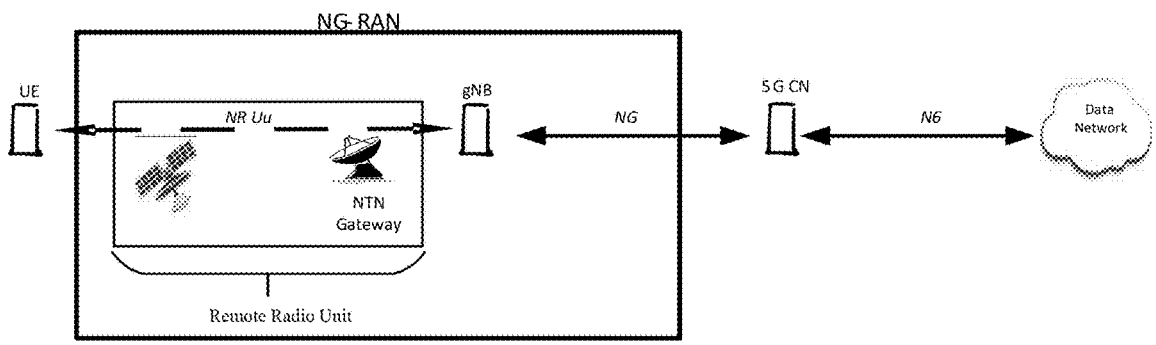
FIGS. 5A and 5B depict example architectures of an NTN.

Typical footprint size of an NTN beam is 100 to 1000 km for a LEO satellite and 200 to 3500 km for a Geostationary orbit (GEO) satellite. As illustrated in FIG. 5A, an NG-RAN deployment may include satellite and NTN gateway (GW) serving as the cellular Uu) link between a UE and a terrestrial network (TN) gNB (and the 5G core network). NG-RAN generally represents radio access network for 5G and provides both NR and LTE radio access. The link between the UE and satellite is generally referred to as the service link, while the link between the satellite and GW is generally referred to as the feeder link.

Figure 5B:
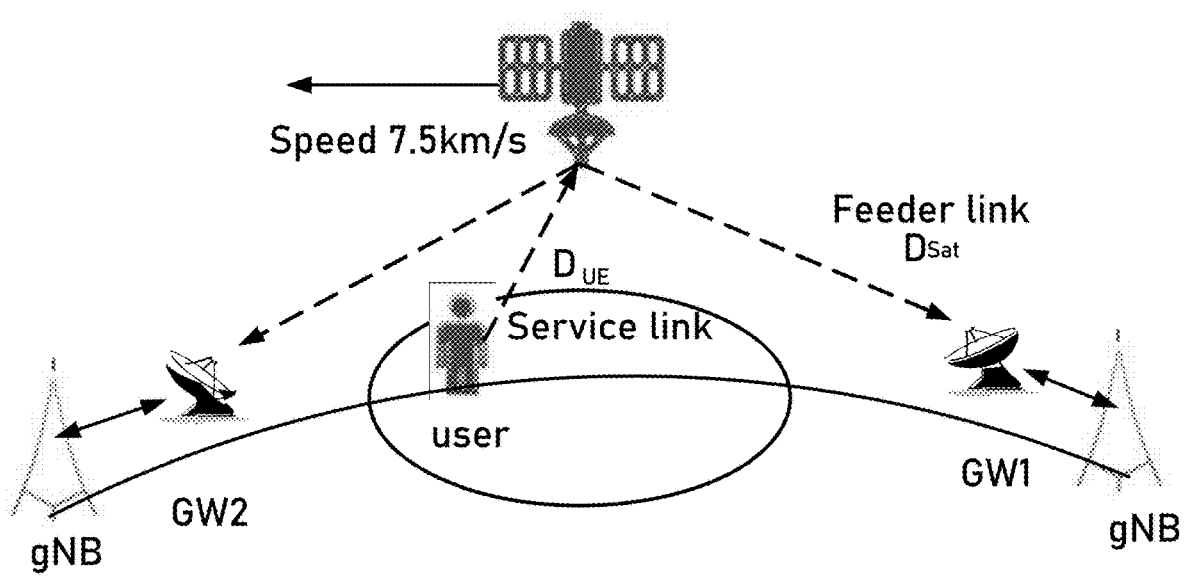

As illustrated in FIG. 5B, the satellite communicates with different gateways as it moves across its orbit. In the illustrated example, as the satellite orbits (at a speed of 7.5 km/s), it moves from GW1 to GW2. Uplink signals from the UE experience a round trip delay (RTD) that is generally a sum of the delay on the service link (DUE) plus the delay on the feeder link (DSAT). The maximum RTD is typically around 541.46 ms for GEO satellites, 25.77 ms for LEO satellites at 600 km altitude, and 41.77 ms for LEO satellites at 1200 km altitude. UE speed can typically be ignored in comparison with speed of LEO satellite.

Aspects Related to Data Collection for Non-Terrestrial Networks

In some cases, to enhance the procedures of the NTN network, the network can configure the UE to collect and report various types of data. Such reports may include reports used for self-organizing networks (SON) and minimization of driving test (MDT) reports.

SON generally refers to an automation technology designed to facilitate the planning, configuration, and management of mobile radio access networks (RANs). Some SON functionality and behavior has been defined and specified in 3GPP (3rd Generation Partnership Project). Example SON features for LTE include Physical Cell Identity (PCI) selection, Automatic Neighbor Relation (ANR) detection, Mobility Robustness Optimization (MRO), and Mobility Load Balancing (MLB), and Energy Savings (ES).

Figure 7:
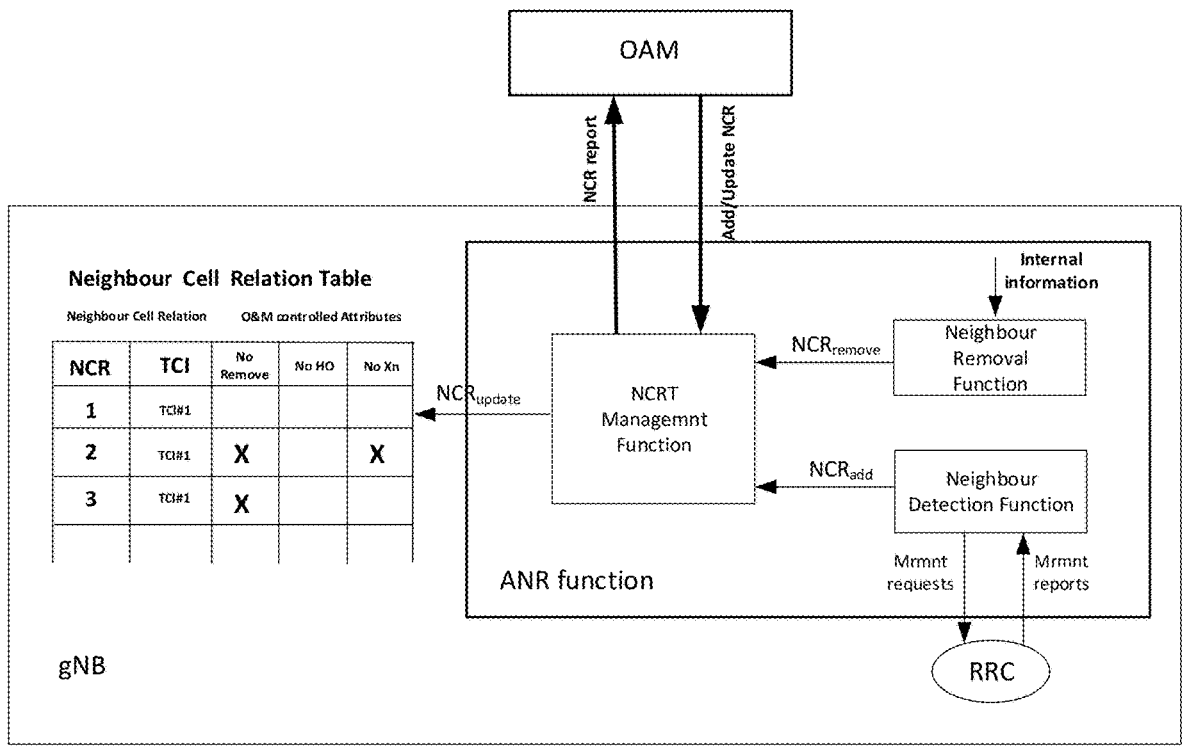
FIG. 7 depicts an example automatic neighbor relation (ANR) function, according to aspects of the present disclosure.

ANR functionality is generally designed to relieve the operator from the burden of manually managing Neighbor Relations (NRs). As shown in FIG. 7, ANR functionality generally resides in the base station (eNB/gNB) and manages a conceptual Neighbor Relation Table (NRT). Located within ANR, the Neighbor Detection Function finds new neighbors and adds them to the NRT. ANR also contains the Neighbor Removal Function which removes outdated NRs.

MDT generally refers to a feature that enables operators to utilize UEs to collect radio measurements and associated location information, in order to assess network performance while reducing the operator expense associated with traditional drive tests. In LTE, the MDT framework typically involves collecting data from UE (over the cellular or "Uu" link) and RAN for detecting potential issues for optimizing different procedures, such as random access channel (RACH), radio link failure (RLF), and connection establishment. MDT also helps network build coverage maps via location reporting.

In NR, the NR SON/MDT framework may take advantage or build on LTE solutions as baseline wherever applicable. The LTE SON/MDT framework may also enhanced to take NR new architectures and features into account. Such features and architectures include multi-RAT dual connectivity (MR-DC), central unit and distributed unit (CU-DU) split architectures, enhanced beam management, and inactive states.

Aspects of the present disclosure propose various mechanisms that may be considered enhancements of SON/MDT reporting enhancements for NTN. For example, the mechanisms provided herein may aid in data collection for NTN optimization as part of an SON/MDT framework. The techniques may help enhance Cell Global Identity (CGI) reporting and Mobility Robust Optimization (MRO) reporting, such as radio link failure (RLF) reporting (e.g., for legacy handover and condition handover-CHO). The techniques may also help enhance RACH reporting, connection establishment failure reporting, MDT reporting (e.g., logged and immediate MDT reporting), and Mobility History Information reporting. The techniques may also help enhance other types of reporting, such as load balancing (e.g., reporting load metrics, such as PRB usage per beam), unified access control (UAC) reporting in NTN and TN, and automatic neighbor relation (ANR) reporting.

Figure 6:
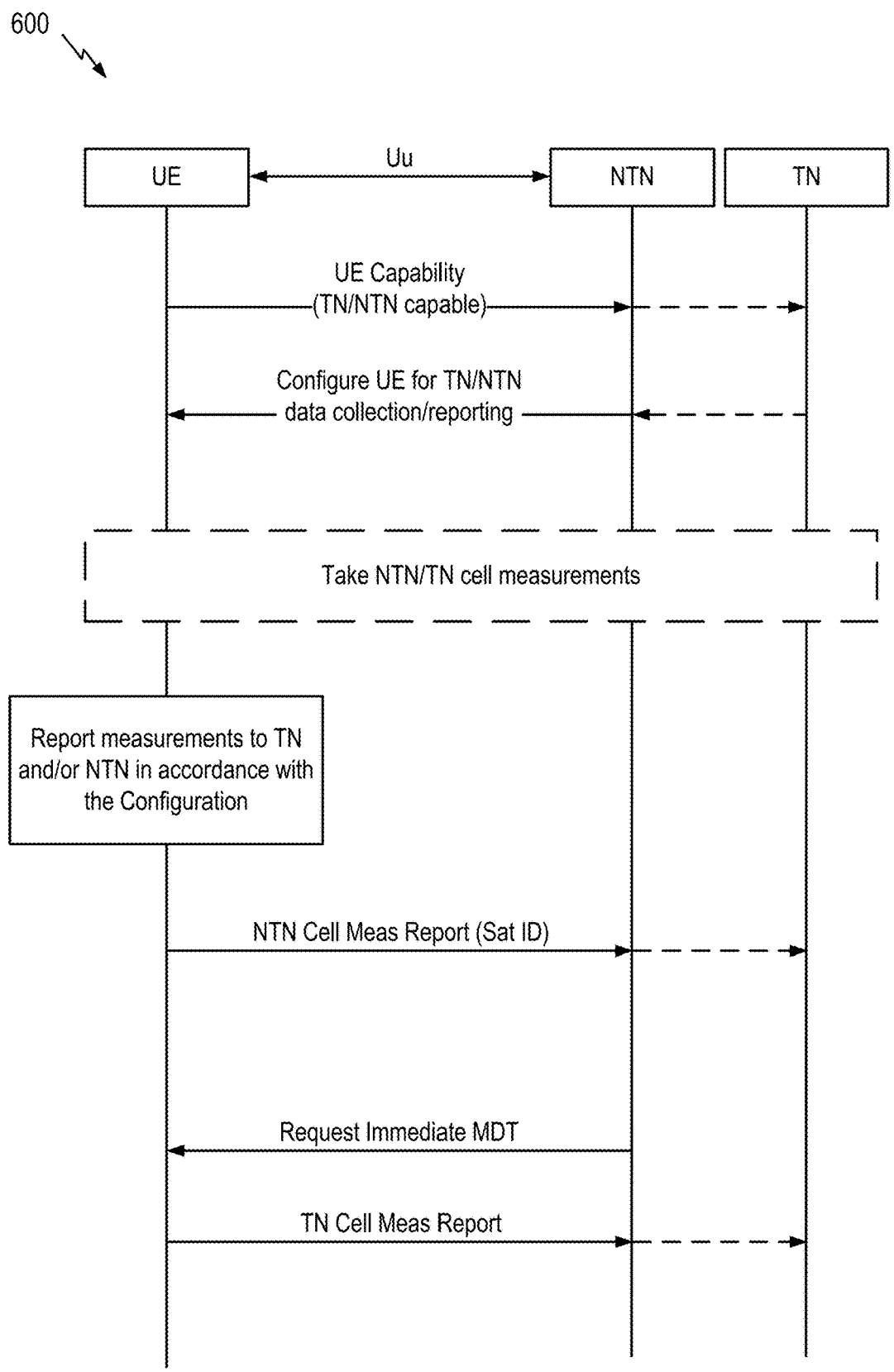
FIG. 6 depicts a call flow diagram for data collection reporting for NTN, according to aspects of the present disclosure.

FIG. 6 is a call flow diagram 600 illustrating how a UE, capable of connecting to both TN and NTN networks, may perform data collection and reporting in accordance with aspects of the present disclosure.

As illustrated, the UE may indicate its capability to support both TN and NTN connections. In response, the network may configure the UE to collect and report both TN and NTN measurements.

Such measurements may include measurements of serving/camped and neighboring TN and NTN cells. As illustrated, when reporting NTN cell measurements, the UE may include the corresponding satellite identifier or a flag that differentiates it from a TN cell.

The configuration may also indicate which measurements the UE is to report, and whether the measurements are to be reported via the TN, NTN, or both. This may be beneficial, for example, because the NTN link may be relatively expensive in terms of having limited bandwidth relative to the TN link. Thus, the UE may be configured to send certain reports via the TN, when possible. Reports may be forwarded between TN and NTN cells, for example, via backhaul connections between.

For immediate MDT, logged MDT, and SON reports, the network may indicate (to the UE), whether the TN cell measurements are to be reported over NTN. For example, in the case of NTN to TN handover (HO), the NTN may request the immediate MDT (e.g., radio resource management RRM measurements of neighboring TN cells) be sent to the serving NTN cells. Similarly, in the case of TN to NTN HO, the TN may request the immediate MDT (e.g., radio resource management RRM measurements of neighboring NTN cells) be sent to the TN cells.

For immediate MDT reporting, new eventTriggered RRM measurements may be defined for handover between NTN and TN, as well as for handover between TN and NTN.

In some cases, SON and logged MDT report contents of NTN and TN can be reported to the TN (e.g., to avoid the relatively expensive NTN link). In some cases, though, SON and logged MDT report contents that include only NTN may be reported to the NTN. For example, random access (RA) report entries (e.g., containing the RACH information over NTN) can be reported to either TN or NTN, while RA-report entries (containing the RACH information over TN) need not be reported to NTN.

In some cases, the UE may maintain a separate availability indication for TN and NTN SON and logged MDT reports. In such cases, the UE may indicate availability of TN and NTN SON and logged MDT reports separately, for example, in the RRCReconfigurationComplete, RRCSetupComplete, RRCReastablishmentComplete, and RRCResumeComplete messages.

In some cases, via a UEInformationRequest, the NTN may choose to request the logged MDT and SON reports with only NTN entries. Upon receiving such a request, the UE may implement filtering of NTN entries on SON/MDT report and only report NTN entries to the network.

A UE may have different capabilities for cross system MDT and SON reporting (e.g., for reporting TN data via NTN or for reporting NTN data via TN). For example, a UE may indicate whether the UE can report NTN SON MDT and logged MDT reports to TN, and vice versa. The UE may also indicate whether the UE can report NTN cell measurements to TN, and vice versa. In some cases, the UE may indicate that it is able to obtain the RA-report, logged MDT, immediate MDT, and other SON MDT reports.

In some cases, a UE may be configured for NTN SON/MDT reporting over the user plane (U-plane). This may be beneficial, for example, as it may avoid a need for the NTN operator to request help from a TN operator. This may essentially grant the UE the flexibility of reporting using whatever transport method it chooses (e.g., non-3GPP access such as Wi-Fi, TN, or NTN). As noted above, the NTN air interface is typically considered to be relatively expensive and a less than ideal choice for MDT reporting. This flexibility may allow a mobile network operator (MNO) to collect data directly from the UE, skipping infra-vendor interaction.

In MDT, a gNB typically uploads the report to a trace collection entity (TCE) either in term of trace file (sent to a TCE address) or trace stream (to a uniform resource locator or URL). If the gNB indicates the TCE address or URL to the UE, the UE can send reports via U-plane over any type of transport it chooses (e.g., TN, NTN, WiFi, wireline, or others), at any suitable time (e.g., at night if advantageous for sending a relatively large file).

In some cases, an Operations, Administration and Maintenance (OAM) function/gNB may send the TCE address/URL and a reporting time window to the UE. The OAM/TCE implementation may ensure there is some security mechanism enabled between a UE and TCE. Such mechanisms may include, for example, a UE IP address and UE ID matching check in TCE and/or using Hypertext Transfer Protocol Secure (HTTPs).

Aspects of the present disclosure may also provide enhancements for Cell Global Identity (CGI) reporting. For example, according to certain aspects, a UE may be configured to send a CGI report with various additional information. For example, the UE may include a Satellite identifier or flag in the CGI report. Additionally (or as an alternative), the UE may include a timestamp, UE to satellite delay, UE specific tracking area code (TAC), elevation angle, or other such information as the part of CGI report. Similarly, such information could be also (or alternatively) included in a different type of report, such as an MDT and/or SON report. In some cases, if multiple TACs are broadcast for the same PCI, the UE may report a current CGI (e.g., based on a serving TAC) or may report multiple CGIs (e.g., based on the broadcasted TAC information).

Aspects of the present disclosure may also provide enhancements for Mobility robust optimization (MRO) reporting. MRO reporting may help with handover process optimization or minimization of radio link failures (RLFs) based on previous observations, for example, by helping to avoid handing over too early, handing over too late, or handover to a wrong cell.

According to certain aspects for a conventional (e.g., non-conditional) handover, a UE capable of connecting to both TN and NTN may include various parameters in an RLF report. For example, the UE may include the measurements of both TN and NTN neighboring cells and a source cell. In some cases, upon RLF or handover failure (HoF), the UE may include both TN and NTN cell measurements (serving and neighboring cells), if the UE is configured to perform TN to NTN HO or NTN to TN HO. RRM measurements may also include the antenna gain (e.g., UE type—handheld UE, smart UE, discType UE) and polarization type. In some cases, the UE may include RRM measurements of only NTN cells, in the case of NTN-to-NTN HO.

In some cases, the UE may provide an indication of whether certain cells involved in the handover (e.g., the sourcePCell, failPCell, ReestablishPCell, and/or ReconnectPCell) are part of a TN or NTN by including satellite identifier. In other words, inclusion of the satellite identifier may indicate a corresponding cell is part of an NTN.

In some cases, the UE may include a new cause code for an RLF for NTN. For example, such a cause code may indicate a TAC update failure, a Global Navigation Satellite System (GNSS) update failure, and/or a minimum elevation issue. This information may be in addition to (or as an alternative to) cause codes currently included in RLF reports (e.g., t310-Expiry, randomAccessProblem, rlc-MaxNumRetx, beamFailureRecoveryFailure).

In some cases, a UE may include an identifier as to whether a reestablishment and/or reconnect NTN cell is broadcasted as a potential target or future cell prior to HoF/RLF. In some cases, cross system (TN to NTN and/or NTN to TN) RLF reporting may be based on UE capability.

According to certain aspects, for conditional handover (CHO), a UE capable of connecting to both TN and NTN may include various NTN related parameters in the RLF report. For example, the UE may include measurements of both TN and NTN candidate, neighboring, and source cells. In some cases, the UE may include both TN and NTN RRM measurements (e.g., serving, candidate, and neighboring cells, with an indicator to indicate the candidate CHO cell, serving and/or neighboring cells) only when a HoF failure happens during a TN to NTN HO or an NTN to TN HO.

In some cases, the RRM measurements may also include the antenna gain (UE type-handheld UE, smart UE, discType UE) and polarization type. The UE may include RRM measurements (serving, candidate, and neighboring cells, with an indicator to indicate the candidate CHO cell) (serving and neighboring cells) of only NTN cells, in case of NTN-to-NTN HO.

In some cases, the UE may also include an indication of whether the sourcePCell, failPCell, ReestablishPCell, and ReconnectPCell are part of TN or NTN by including satellite identifier (as noted above for conventional HO). In some cases, the UE may include an indication of whether the reestablishment and/or reconnect NTN cell is broadcast as the potential target or future cell upon HoF/RLF.

The UE may include configured CHO conditions upon detection of HoF in the RLF report. In some cases, the UE may include time-based and/or location-based CHO conditions or related parameters.

Time-based CHO conditions or related parameters may include a time elapsed since the configured earliest time a CHO can be executed until HoF (which can be computed explicitly or implicitly), an indication whether the time range was sufficient for performing the CHO, and/or an indication of whether the UE detected the configured candidate cells in the configured time range (may be RRM measurement can be sufficient) or a list of NTN cells that were detected in the configured time.

Location-based conditions or related parameters may include: time spent by the UE in a configured location, an indication of whether the UE detected the configured candidate cells in a configured area range (may be RRM measurement can be sufficient) or a list of NTN cells that were detected in the configured area, a time spent by the UE in the configured area range, or a difference in distance and/or difference in RSRP observed by the UE that did not meet to configured condition.

IF the UE is configured with time-based, location-based, and/or RSRP-based CHO trigger conditions, the UE may include an indication of which CHO trigger condition was met. In some cases, the UE may indicate a time difference when these execution condition met, for example, if multiple trigger conditions were met (e.g., time reference may correspond to a first condition met).

In some cases, the UE may include a new cause code for an RLF for NTN CHO. For example, such a cause code may indicate a TAC update failure, a GNSS update failure, and/or a minimum elevation issue. In some cases, cross system (TN to NTN and/or NTN to TN) RLF reporting may be based on UE capability.

Aspects of the present disclosure may also provide enhancements for RACH reporting, for example, that may help optimize the NTN RACH procedure. For example, a UE capable of connecting to both TN and NTN may include various NTN related fields or information in the RACH report. Such information may include an indication of whether the RACH report entry is for NTN or TN (e.g., in case this is not readily inferred from the content of RA report or Cell ID), PRACH resources related information for msg1/msgA, a timestamp and location information to indicate when and where UE performed RACH procedure, or a RACH option used GNSS-assisted TA or common TA, and/or an indication of whether the UE uses a random access preamble reserved for UEs supporting GNSS, or for UEs not supporting GNSS.

In some case, a new RACH purpose (e.g., "TA report" or "TA update") may be indicated. In some cases, a single RA-report can contain the information of RACH procedure over TN and NTN.

In some cases, a UE may report various information in a RACH report (e.g., for optimization of 2-step and 4-step RACH and threshold value optimizations for selecting 2-step RACH over 4-step RACH). Such information may include a logical channel (LCH) identity, measured RTT value, and measured elevation angle. Such information may also include a UE specific service link RTT and broadcasted gNB RTT compensation, time and frequency pre-compensation used by UE for PUSCH, and/or backoff counter length configured at the UE for initial RACH.

In some cases, a UE may report certain legacy identifiers or information that can be used for NTN. For example, this may include a measured RSRP value prior to performing RACH if both 2-step and 4-step RACH is configured at the UE, or an indication of whether the measured RSRP value is above or below the configured threshold value. Such information may also include an indication of whether contention is detected, and/or whether a fallback from a 2-step RACH procedure to a 4-step RACH procedure has happened.

Aspects of the present disclosure may also provide enhancements for Connection Establishment Failure (CEF) reporting, for example, which may help minimize connection establishment failures.

In some cases, a UE capable of connecting to both TN and NTN may include various NTN related fields or information in the CEF report. Such information may include timestamp and location information to determine when and where CEF happened at the NTN, an identifier whether the failed cell is broadcasted as the potential target or future cell, and/or an indication whether the failed cell is part of NTN or TN in the CEF report (e.g., if not readily inferred form the Cell ID), for example, by including the satellite identifier if the CEF happened over NTN.

In some cases, a UE capable of connecting to both TN and NTN, may include measurements of both TN and NTN carrier frequencies. CEF report contents (RRM measurements of failed cell and neighboring cells, number of connection failures, timeSinceFailure, and others) for TN and NTN may be obtained when reselection happens from TN to NTN or from NTN to TN, separately. This is an enhancement relative to conventional CEF reports typically only include CEF statistics on the latest cell (e.g., timeSinceFailure measures the time since failure irrespective of whether UE was connected previously to TN or NTN). A UE capable of connecting to both TN and NTN may maintain separate CEF report for TN and NTN.

In some cases, based on information elements (IEs) in the RACH report and/or CEF report, an NTN cell/network can compute a number of failed and successful RACH processes after a gateway/fixed cell switch off (e.g., per 2-step and 4-step procedures). The NTN cell/network may use this information to minimize an average migration time (e.g., if satellite is switched off). For example, NTN cell/network may attempt to optimize backoff counter length and other configuration parameters to maximize the number of successful RACH attempts.

Aspects of the present disclosure may also provide enhancements for MDT reporting (e.g., Logged MDT reports and Immediate MDT reports), for example, which may help optimize cell selection and resection procedure or CCO in IDLE/INACTIVE states.

In some cases, a UE capable of connecting to both TN and NTN may include various NTN related fields or information in the logged MDT report. Such information may include, for example, an indication of whether a camped cell is part for NTN or TN (e.g., if not readily inferred form the Cell ID), and may include the satellite identifier if the camped cell or neighboring cell is part of NTN.

In some cases, a UE capable of connecting to both TN and NTN may include measurements of both TN and NTN carrier frequencies. The UE may also include an explicit indication of a cell visibility time or cell switch-off time of a particular satellite or frequency/PCID can be provided by the UE explicitly—may be useful in the case of RRM relaxed. As an alternative, cell visibility time may be computed by the network based on the camped cell or neighboring cell measurements and a particular satellite identifier or frequency/PCID or the UE may include an indication whether the camped and neighboring cell (satellite identifier or frequency/PCID) is visible with timestamps.

A UE may also include various information as part of CGI information include in the logged MDT. Such information may include, for example, a list of TAC selected in order and duration of each TAC.

In some cases, a UE capable of connecting to both TN and NTN may include various NTN related fields or information in the Immediate MDT report, for example, which may be useful for quality of service (QoS) verification in the NTN.

In some cases, conventional TN immediate MDT measurements may be reused for NTN, at the NTN cells. Such measurements may include data volume, UE UL and DL throughput, DL and UL delay, and DL and UL packet loss. In some cases, separate UL and DL packet delay and throughput can be computed, for example, when HARQ stalling/issues are detected and HARQ stalling/issues are not detected.

In some cases, for the RRM measurement of the NTN cell, the UE may include various information elements (IEs). For example, such IEs may include cell and beam level measurements with satellite identifier or flag. Various information can either be inferred from RRM measurements or can explicitly indicated. Such information may include which configured cell/frequency was not detected in the configured MG or with configured SMTC, and how long a PCID/frequency is detected with the given SMTC/MG. In some cases, the UE may include the antenna gain (UE type-handheld UE, smart UE, discType UE) and antenna polarization.

In some cases, an average, minimum, maximum, median, histogram, and/or excess propagation delay and/or differential delay may be measured by the UE in a measurement period.

In some cases, the UE may report a hybrid automatic repeat request (HARQ) issue for uplink (UL), which may be, provided event-based (e.g., if a HARQ issue is detected more than x-times, or periodic). In some cases, the UE may report a HARQ issue as part of periodic or event based immediate MDT or using UE assistance information (UAI). In some case, the UE may provide an indication about HARQ processes (e.g., which HARQ processes were successful, and which were not) and/or periods in which a HARQ issue has been detected.

In some cases, a distributed unit (DU) may report a HARQ stalling issue for UL and DL, by providing various information. For example, such information may include an indication about HARQ processes (e.g., which HARQ process were successful, and which were stalled) and/or periods in which HARQ stalling has been detected.

Aspects of the present disclosure may also provide enhancements for reporting Mobility/UE History Information, which may be useful for robust optimization (RO).

In some cases, a UE capable of connecting to both TN and NTN (or a gNB) may include various NTN related fields or information, such as the NTN Cell ID, satellite identifier, and time spent by the UE in that cell/satellite in the UE's mobility history information and gNB's UE history information. In such cases, the UE or gNB may include the beginning time when UE connect to the NTN cell and the time until UE is connected to the NTN cell. Alternatively, the UE or gNB may include the beginning time when UE connect to the NTN cell and time spent on that NTN cell and/or location information during cell transitions (starting and final location information), if the UE is connected to NTN cell.

In some cases, a UE or gNB may obtain the mobility/UE history information in a single report for both NTN and TN cell transitions.

In some cases, a UE or gNB may obtain two different reports for TN and NTN transitions. In such cases, NTN mobility/UE history information may include only NTN transitions and stop recording when UE moves to TN (and may include an indication if UE has transition to the TN cell). In some cases, TN mobility/UE history information can include both NTN and TN cell transitions.

In some cases, mobility/UE history information may be shared between TN and NTN (inter-system sharing). For example, NTN may share NTN mobility/UE history information with TN, and/or TN may share TN mobility/UE history information with NTN.

Aspects of the present disclosure may also provide enhancements for load balancing in NTN, which may be useful for Mobility robustness optimization (MRO) purposes (e.g., in the case of handover between NTN and TN or over one satellite to another).

In some cases, various information can be included as the load information for NTN for periodic or event triggered load reporting. Such information may include a satellite identifier, physical resource block (PRB) usage at the satellite, an on-board hardware (HW) capacity indicator, a number of active user per satellite identifier per NTN cell, a number of inactive user per satellite identifier per NTN cell, an RRC connection per satellite identifier per NTN cell, a Transport Network Layer (TNL) capacity indicator per satellite identifier per NTN cell, and/or various other information.

In some cases, NTN load information and NTN visibility information (obtained from the UE) may be shared with TN periodically and/or event-triggered (for example, upon cell change, gateway change, and load threshold). In some cases, based on the NTN load and visibility information, the TN can implement energy saving schemes, for example, by switching ON/OFF a TN cell.

UAC reporting for TN may include various information for each access attempt. Such information may include, for example, for each attempt, an Access Category and Identity (ies) used, whether this was a NAS initiated or RAN initiated attempt, whether the access was barred or not, the access timer duration (T390) recorder, whether T390 was already running when this attempt was made, whether a reject timer (T302) was running during the access, whether the timers stopped due to a cell reselection, UAC barring information (from SIB1) applied for this attempt, the random number used for the access barring check, and/or a resume or establishment cause for this attempt. In some cases, the UE may report the availability of UAC related measurements in RRC Setup or Resume request. In some cases, the UE reporting availability of UAC related measurements after moving to RRC Connected state may be included in a new RRC message or a new indication in UE assistance information can be used for this purpose. This mechanism may also be used for UAC measurements which happen during the RRC Connected state.

Aspects of the present disclosure may also provide enhancements for unified access control (UAC) reporting in NTN, for example, which may allow for report information regarding access barring check for an access attempt associated with a given Access Category and one or more Access Identities upon request from upper layers or the RRC layer.

In some cases, various information (in addition or as an alternative to the various information for UAC reporting for TN) can be included in the UAC reporting for NTN, for example, upon an access attempt failure. For example, such information may include time information of the access attempt, location information where the access attempt is made, TAC information and PCI, CGI of the access cell, access category, satellite identifier, and/or cell ID. The information may also include an indication of whether an access attempt failure results in the reselection to the TN.

Aspects of the present disclosure may also provide enhancements the automatic neighbor relation (ANR) function. As noted above, the general purpose of the ANR function is to relieve the operator from the burden (time and expense) of manually managing neighbor cell relation.

In some cases, as the satellite are mobile, aspects of the present disclosure may provide area and time based ANR functions. In such cases, the NTN cell and TN cell can maintain a time and area dependent Neighbor Cell Relation (NCRT) table for both TN and NTN neighboring cells. FIG. 7 illustrates an example of such a table.

In some cases, the time and/or area dependent NCRT can be shared over X2/Xn/ICL interface between TN and NTN cells, and NTN and NTN cells.

Figure 9:
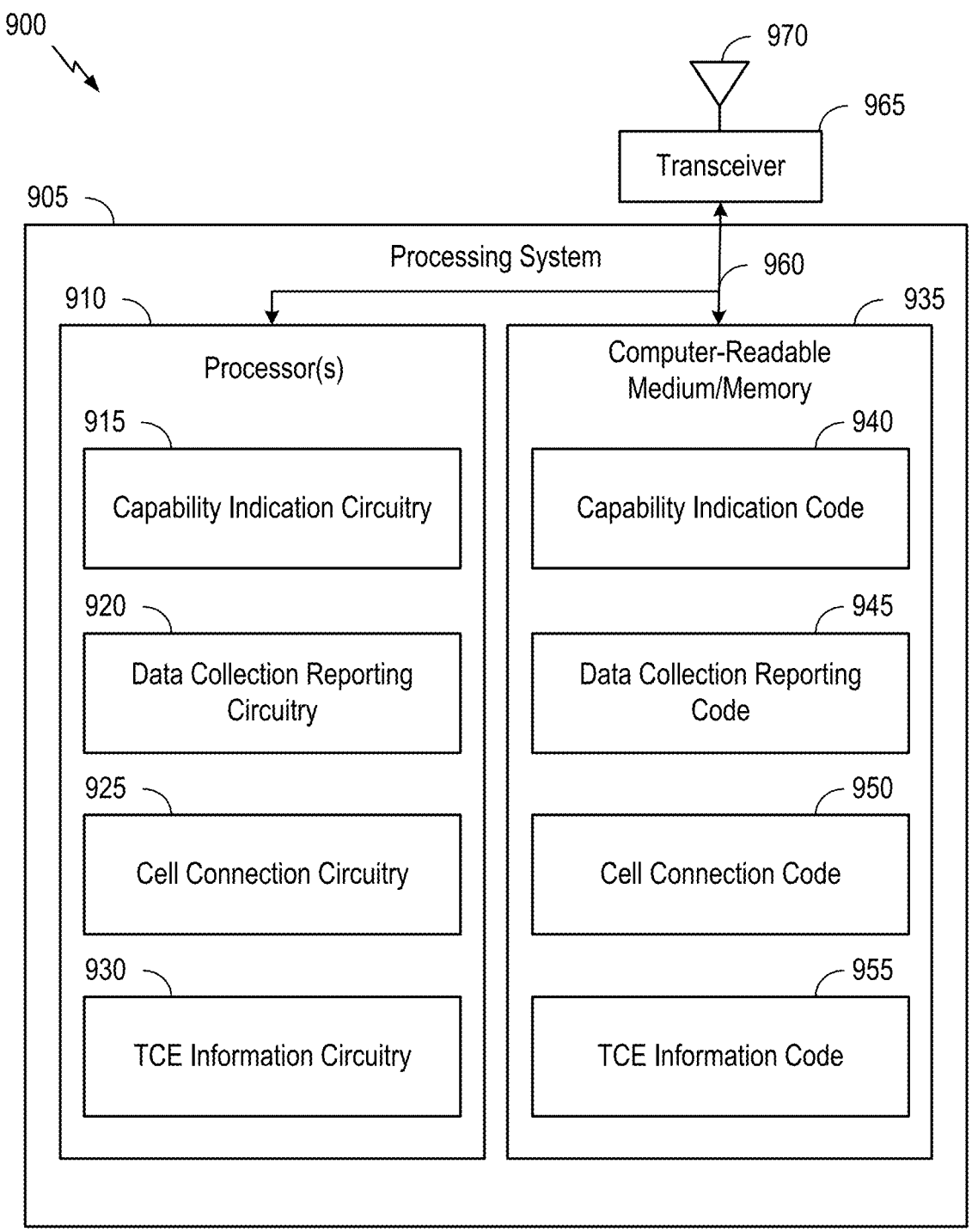
FIG. 9 shows an example of a communications device according to aspects of the present disclosure.

In some cases, as an alternative, the time and/or area dependent NCRT may be obtained only by the TN cell and OAM can request the NCR report from the TN cell and forward it to NTN cell after some post-processing. FIG. 9 illustrates an example of an OAM obtaining an NCR report in such a manner. In some cases, based on a time and/or area dependent NCR report obtained from the cell, the OAM may implement a mechanism to avoid a PCI collision ahead of time.

Example Methods & Example Wireless Communication Devices

Figure 8:
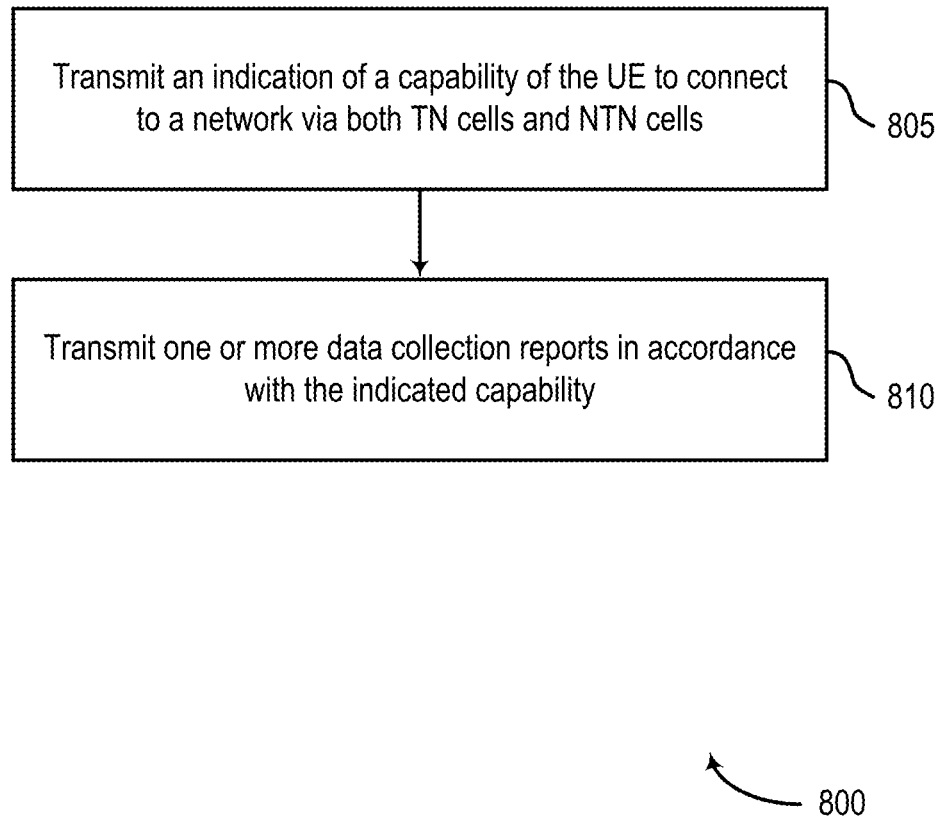
FIG. 8 shows an example method for data collection reporting for terrestrial network (TN) cells and NTN cells according to aspects of the present disclosure.

FIG. 8 shows an example of a method 800 for data collection reporting for TN cells and NTN cells according to aspects of the present disclosure. In some aspects, a user equipment, such as UE 104 of FIGS. 1 and 2, or processing system 905 of FIG. 9, may perform the method 800.

At operation 805, the system transmits an indication of a capability of the UE to connect to a network via both TN cells and NTN cells. In some cases, the operations of this step refer to, or may be performed by, capability indication circuitry as described with reference to FIG. 9.

At operation 810, the system transmits one or more data collection reports in accordance with the indicated capability. In some cases, the operations of this step refer to, or may be performed by, data collection reporting circuitry as described with reference to FIG. 9.

In some aspects, the data collection reports comprise data collection reports for at least one of: network self-configuration or network self-optimization. In some aspects, for data collection reports that include measurements for an NTN cell, the UE includes a satellite identifier corresponding to the NTN cell or an identification that differentiate NTN cell from TN cell.

In some aspects, the method 800 includes receiving signaling indicating whether the UE is to send one or more of the data collection reports via a TN cell, via an NTN cell, or via both TN and NTN cells. In some aspects, the signaling indicates one or more trigger events for at least one of handover between an NTN cell and a TN cell or handover between a TN cell and an NTN cell. In some aspects, the signaling indicates that data collection reports including TN and NTN cell measurement are to be sent via a TN cell, that data collection reports including only NTN cell measurements are to be sent via an NTN cell, or both.

In some aspects, the UE separately indicates availability of data collection reports for TN cells and NTN cells. In some aspects, the method 800 includes receiving a request for a data collection report for NTN cells only. In some aspects, the method 800 includes sending a data collection report that includes entries for NTN cells only, in response to the request.

In some aspects, the capability indicated by the UE indicates at least one of: whether the UE is able to report data collection reports, for one or more NTN cells, via a TN cell; or whether the UE is able to report data collection reports, for one or more TN cells, via an NTN cell.

In some aspects, transmitting one or more data collection reports at operation 810 comprises transmitting the one or more data collection reports to a TCE via a user plane. In some aspects, the method 800 includes receiving at least one of an IP address of the TCE or a URL for the TCE. In some aspects, the method 800 includes transmitting the one or more data collection reports to the TCE address or URL, via at least one of a TN cell, an NTN cell, or a LAN.

FIG. 9 depicts an example communications device 900 that includes various components operable, configured, or adapted to perform operations for the techniques disclosed herein, such as the operations depicted and described with respect to FIG. 8. In some examples, communication device may be a user equipment 104 as described, for example with respect to FIGS. 1 and 2.

Communications device 900 includes a processing system 905 coupled to a transceiver 965 (e.g., a transmitter and/or a receiver). Transceiver 965 is configured to transmit (or send) and receive signals for the communications device 900 via an antenna 970, such as the various signals as described herein. A transceiver 965 may communicate bi-directionally, via antennas 970, wired, or wireless links as described above. For example, the transceiver 965 may represent a wireless transceiver 965 and may communicate bi-directionally with another wireless transceiver 965. The transceiver 965 may also include or be connected to a modem to modulate the packets and provide the modulated packets to for transmission, and to demodulate received packets. In some examples, transceiver 965 may be tuned to operate at specified frequencies. For example, a modem can configure the transceiver 965 to operate at a specified frequency and power level based on the communication protocol used by the modem.

Processing system 905 may be configured to perform processing functions for communications device 900, including processing signals received and/or to be transmitted by communications device 900. Processing system 905 includes one or more processors 910 coupled to a computer-readable medium/memory 935 via a bus 960.

In some examples, one or more processors 910 may include one or more intelligent hardware devices, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the one or more processors 910 are configured to operate a memory array using a memory controller. In other cases, a memory controller is integrated into the one or more processors 910. In some cases, the one or more processors 910 are configured to execute computer-readable instructions stored in a memory to perform various functions. In some aspects, one or more processors 910 include special purpose components for modem processing, baseband processing, digital signal processing, or transmission processing.

In certain aspects, computer-readable medium/memory 935 is configured to store instructions (e.g., computer-executable code) that when executed by the one or more processors 910, cause the one or more processors 910 to perform the operations illustrated in FIG. 8, or other operations for performing the various techniques discussed herein.

In one aspect, computer-readable medium/memory 935 includes capability indication code 940, data collection reporting code 945, cell connection code 950, and TCE information code 955.

Examples of a computer-readable medium/memory 935 include random access memory (RAM), read-only memory (ROM), solid state memory, a hard drive, a hard disk drive, etc. In some examples, computer-readable medium/memory 935 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Various components of communications device 900 may provide means for performing the methods described herein, including with respect to FIG. 8.

In some examples, means for transmitting or sending (or means for outputting for transmission) may include the transceivers 254 and/or antenna(s) 252 of the user equipment 104 illustrated in FIG. 2 and/or transceiver 965 and antenna 970 of the communication device in FIG. 9.

In some examples, means for receiving (or means for obtaining) may include the transceivers 254 and/or antenna(s) 252 of the user equipment 104 illustrated in FIG. 2 and/or transceiver 965 and antenna 970 of the communication device in FIG. 9.

In some examples, means for determining, deciding, and/or selecting may include various processing system 905 components, such as: the one or more processors 910 in FIG. 9, or aspects of the user equipment 104 depicted in FIG. 2, including receive processor 258, transmit processor 264, TX MIMO processor 266, and/or controller/processor 280.

In one aspect, one or more processors 910 includes capability indication circuitry 915, data collection reporting circuitry 920, cell connection circuitry 925, and TCE information circuitry 930.

According to some aspects, capability indication circuitry 915 transmits an indication of a capability of the UE to connect to a network via both TN cells and NTN cells. In some aspects, the capability indicated by the UE indicates at least one of: whether the UE is able to report data collection reports, for one or more NTN cells, via a TN cell; or whether the UE is able to report data collection reports, for one or more TN cells, via an NTN cell.

According to some aspects, data collection reporting circuitry 920 transmits one or more data collection reports in accordance with the indicated capability. In some aspects, the data collection reports include data collection reports for at least one of: network self-configuration or network self-optimization. In some examples, for data collection reports that include measurements for an NTN cell, the UE includes a satellite identifier corresponding to the NTN cell or an identification that differentiate NTN cell from TN cell. In some aspects, the UE separately indicates availability of data collection reports for TN cells and NTN cells. In some examples, data collection reporting circuitry 920 receives a request for a data collection report for NTN cells only. In some examples, data collection reporting circuitry 920 sends a data collection report that includes entries for NTN cells only, in response to the request. In some examples, data collection reporting circuitry 920 transmits the one or more data collection reports to the TCE address or URL, via at least one of a TN cell, an NTN cell, or a LAN.

According to some aspects, cell connection circuitry 925 receives signaling indicating whether the UE is to send one or more of the data collection reports via a TN cell, via an NTN cell, or via both TN and NTN cells. In some aspects, the signaling indicates one or more trigger events for at least one of handover between an NTN cell and a TN cell or handover between a TN cell and an NTN cell. In some aspects, the signaling indicates that data collection reports including TN and NTN cell measurement are to be sent via a TN cell, that data collection reports including only NTN cell measurements are to be sent via an NTN cell, or both.

According to some aspects, data collection reporting circuitry 920 transmits the one or more data collection reports by transmitting the one or more data collection reports to a TCE via a user plane. In some examples, TCE information circuitry 930 receives at least one of an IP address of the TCE or a URL for the TCE.

Notably, FIG. 9 is just use example, and many other examples and configurations of communication device are possible.

Figure 10:
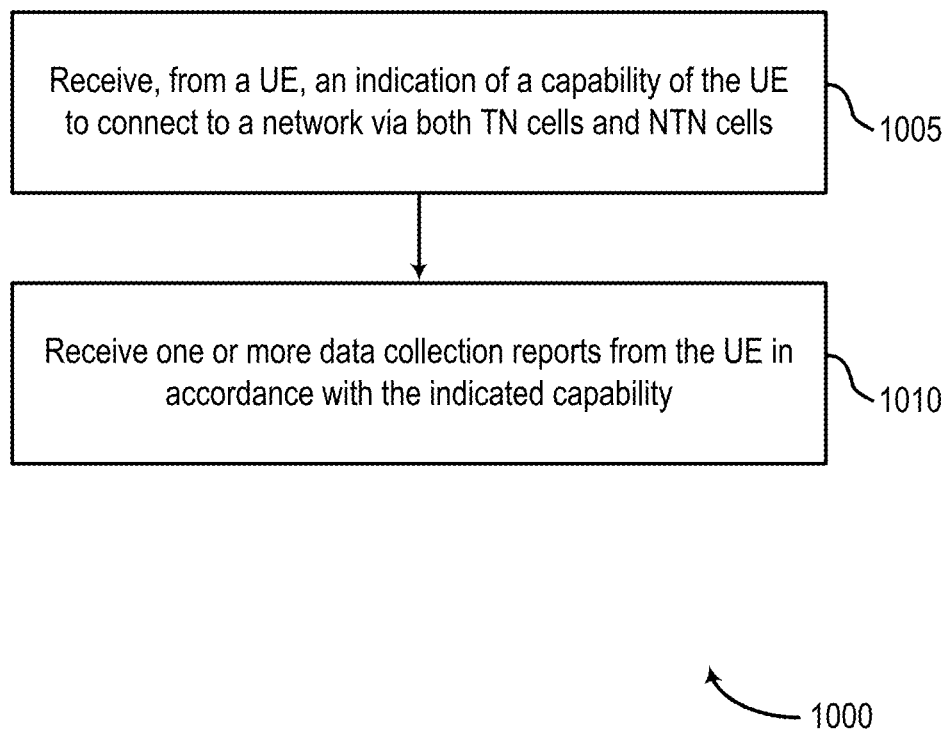
FIG. 10 shows an example method for data collection reporting for TN cells and NTN cells according to aspects of the present disclosure.

FIG. 10 shows an example of a method 1000 for data collection reporting for TN cells and NTN cells according to aspects of the present disclosure. In some aspects, a base station, such as base station 102 of FIGS. 1 and 2, or processing system 1105 of FIG. 11, may perform the method 1000.

At operation 1005, the system receives, from a UE, an indication of a capability of the UE to connect to a network via both TN cells and NTN cells. In some cases, the operations of this step refer to, or may be performed by, UE capability management circuitry as described with reference to FIG. 11.

At operation 1010, the system receives one or more data collection reports from the UE in accordance with the indicated capability. In some cases, the operations of this step refer to, or may be performed by, UE data collection report circuitry as described with reference to FIG. 11.

In some aspects, the data collection reports comprise data collection reports for at least one of: network self-configuration or network self-optimization. In some aspects, the data collection reports that include measurements for an NTN cell also include a satellite identifier corresponding to the NTN cell or an identification that differentiate NTN cell from TN cell.

In some aspects, the method 1000 includes transmitting signaling, to the UE, indicating whether the UE is to send one or more of the data collection reports via a TN cell, via an NTN cell, or via both NT and NTN cells. In some aspects, the signaling indicates one or more trigger events for at least one of handover between an NTN cell and a TN cell or handover between a TN cell and an NTN cell. In some aspects, the signaling indicates that data collection reports including TN and NTN cell measurement are to be sent via a TN cell, that data collection reports including only NTN cell measurements are to be sent via an NTN cell, or both.

In some aspects, the UE separately indicates availability of data collection reports for TN cells and NTN cells. In some aspects, the method 1000 includes transmitting the UE a request for a data collection report for NTN cells only. In some aspects, the method 1000 includes receiving a data collection report that includes entries for NTN cells only, in response to the request. In some aspects, the capability indicated by the UE indicates at least one of: whether UE the UE is able to report data collection reports, for one or more NTN cells, via a TN cell; or whether UE the UE is able to report data collection reports, for one or more TN cells, via an NTN cell.

In some aspects, receiving one or more data collection reports comprises receiving the one or more data collection reports sent to a TCE via a user plane. In some aspects, the method 1000 includes transmitting, to the UE, at least one of an IP address of the TCE or a URL for the TCE. In some aspects, the method 1000 includes receiving the one or more data collection reports to the TCE address or URL, via at least one of a TN cell, an NTN cell, or a LAN.

Figure 11:
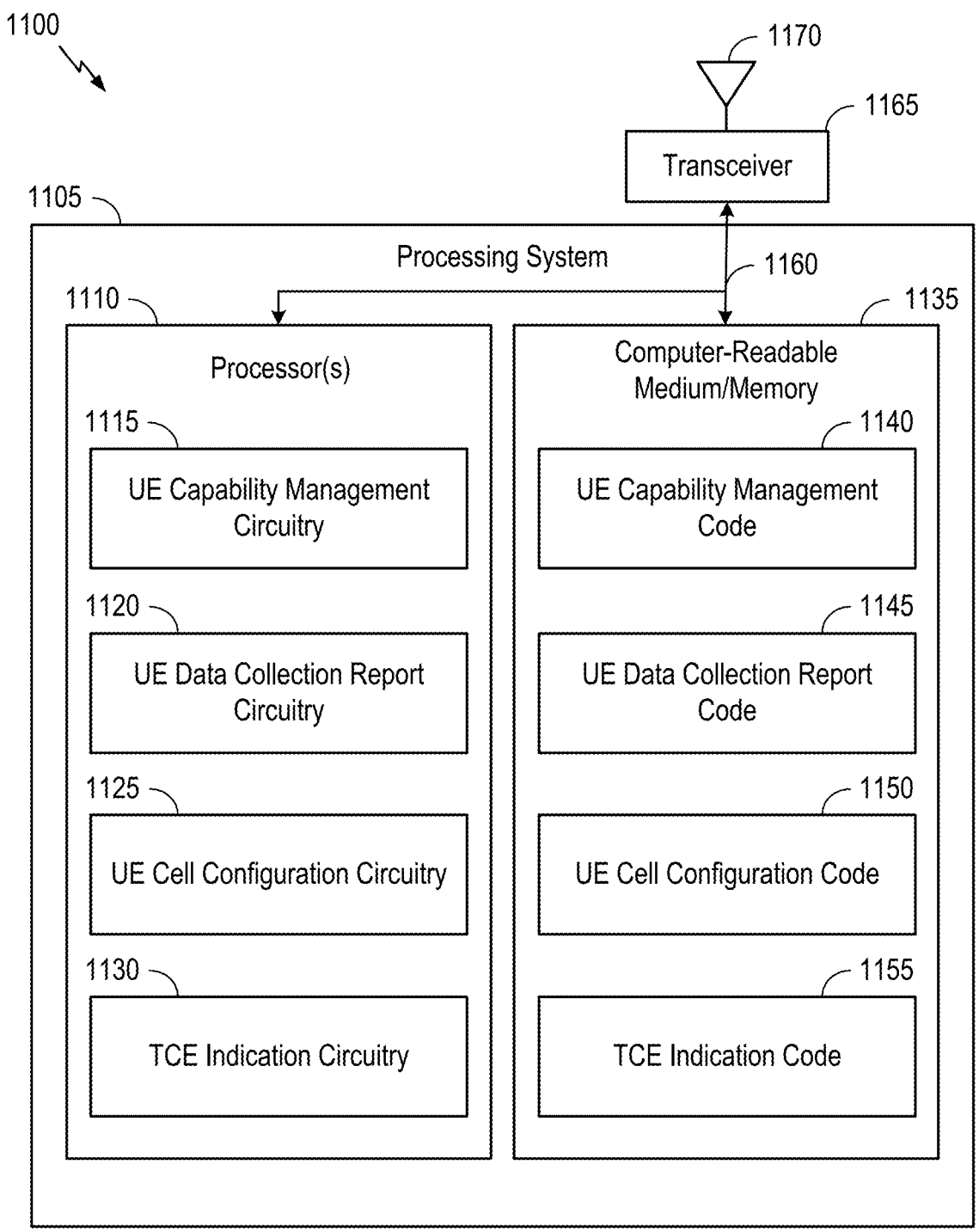
FIG. 11 shows an example of a communications device according to aspects of the present disclosure.

FIG. 11 depicts an example communications device 1100 that includes various components operable, configured, or adapted to perform operations for the techniques disclosed herein, such as the operations depicted and described with respect to FIG. 10. In some examples, communication device may be a base station 102 as described, for example with respect to FIGS. 1 and 2.

Communications device 1100 includes a processing system 1105 coupled to a transceiver 1165 (e.g., a transmitter and/or a receiver). Transceiver 1165 is configured to transmit (or send) and receive signals for the communications device 1100 via an antenna 1170, such as the various signals as described herein. In some aspects, transceiver 1165 is an example of, or includes aspects of, the corresponding element described with reference to FIG. 9.

Processing system 1105 may be configured to perform processing functions for communications device 1100, including processing signals received and/or to be transmitted by communications device 1100. Processing system 1105 includes one or more processors 1110 coupled to a computer-readable medium/memory 1135 via a bus 1160. In certain aspects, computer-readable medium/memory 1135 is configured to store instructions (e.g., computer-executable code) that when executed by the one or more processors 1110, cause the one or more processors 1110 to perform the operations illustrated in FIG. 10, or other operations for performing the various techniques discussed herein.

In one aspect, computer-readable medium/memory 1135 includes UE capability management code 1140, UE data collection report code 1145, UE cell configuration code 1150, and TCE indication code 1155. In some aspects, computer-readable medium/memory 1135 is an example of, or includes aspects of, the corresponding element described with reference to FIG. 9.

Various components of communications device 1100 may provide means for performing the methods described herein, including with respect to FIG. 10.

In some examples, means for transmitting or sending (or means for outputting for transmission) may include the transceivers 232 and/or antenna(s) 234 of the base station 102 illustrated in FIG. 2 and/or transceiver 1165 and antenna 1170 of the communication device in FIG. 11.

In some examples, means for receiving (or means for obtaining) may include the transceivers 232 and/or antenna(s) 234 of the base station 102 illustrated in FIG. 2 and/or transceiver 1165 and antenna 1170 of the communication device in FIG. 11.

In some examples, means for determining, deciding, and/or selecting may include various processing system 1105 components, such as: the one or more processors 1110 in FIG. 11, or aspects of the base station 102 depicted in FIG. 2, including receive processor 238, transmit processor 220, TX MIMO processor 230, and/or controller/processor 240.

In one aspect, one or more processors 1110 includes UE capability management circuitry 1115, UE data collection report circuitry 1120, UE cell configuration circuitry 1125, and TCE indication circuitry 1130. In some aspects, one or more processors 1110 are examples of, or include aspects of, the corresponding element described with reference to FIG. 9.

According to some aspects, UE capability management circuitry 1115 receives, from a UE, an indication of a capability of the UE to connect to a network via both TN cells and NTN cells. In some aspects, the capability indicated by the UE indicates at least one of: whether UE the UE is able to report data collection reports, for one or more NTN cells, via a TN cell; or whether UE the UE is able to report data collection reports, for one or more TN cells, via an NTN cell.

According to some aspects, UE data collection report circuitry 1120 receives one or more data collection reports from the UE in accordance with the indicated capability. In some aspects, the data collection reports include data collection reports for at least one of: network self-configuration or network self-optimization. In some aspects, the data collection reports that include measurements for an NTN cell also include a satellite identifier corresponding to the NTN cell or an identification that differentiate NTN cell from TN cell. In some aspects, the UE separately indicates availability of data collection reports for TN cells and NTN cells. In some examples, UE data collection report circuitry 1120 transmits the UE a request for a data collection report for NTN cells only. In some examples, UE data collection report circuitry 1120 receives a data collection report that includes entries for NTN cells only, in response to the request. In some examples, UE data collection report circuitry 1120 receives the one or more data collection reports to the TCE address or URL, via at least one of a TN cell, an NTN cell, or a LAN.

According to some aspects, UE cell configuration circuitry 1125 transmits signaling, to the UE, indicating whether the UE is to send one or more of the data collection reports via a TN cell, via an NTN cell, or via both NT and NTN cells. In some aspects, the signaling indicates one or more trigger events for at least one of handover between an NTN cell and a TN cell or handover between a TN cell and an NTN cell. In some aspects, the signaling indicates that data collection reports including TN and NTN cell measurement are to be sent via a TN cell, that data collection reports including only NTN cell measurements are to be sent via an NTN cell, or both.

According to some aspects, UE data collection report circuitry 1120 receives one or more data collection reports by receiving the one or more data collection reports sent to a TCE via a user plane. In some examples, TCE indication circuitry 1130 transmits, to the UE, at least one of an IP address of the TCE or a URL for the TCE.

Notably, FIG. 11 is just use example, and many other examples and configurations of communication device are possible.

Figure 12:
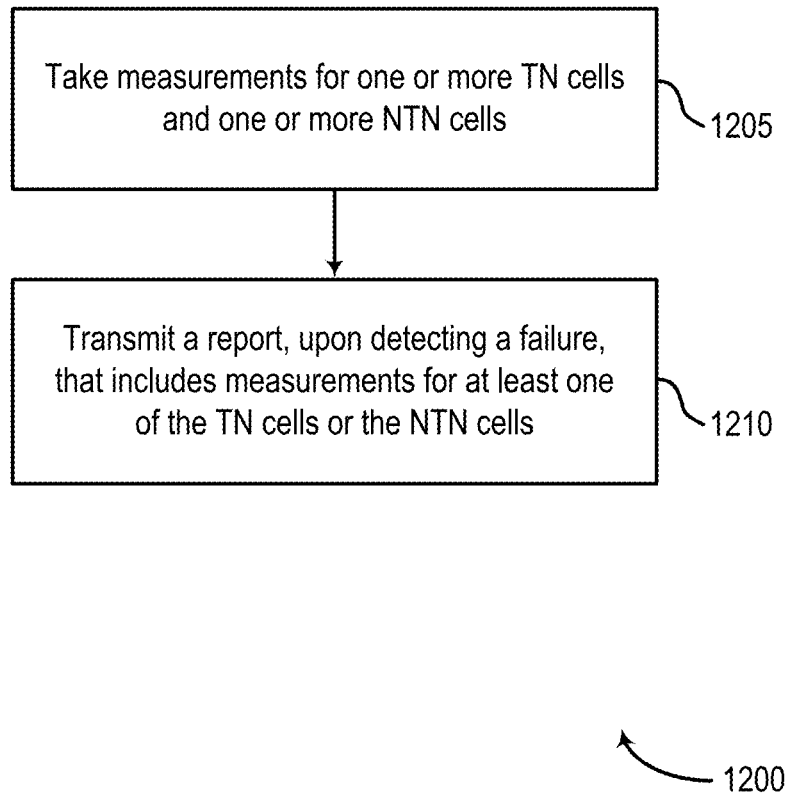
FIG. 12 shows an example method for data collection reporting for TN cells and NTN cells according to aspects of the present disclosure.

FIG. 12 shows an example of a method 1200 for data collection reporting for TN cells and NTN cells according to aspects of the present disclosure. In some aspects, a user equipment, such as UE 104 of FIGS. 1 and 2, or processing system 1305 of FIG. 13, may perform the method 1200.

At operation 1205, the system takes measurements for one or more TN cells and one or more NTN cells. In some cases, the operations of this step refer to, or may be performed by, cell measurement circuitry as described with reference to FIG. 13.

At operation 1210, the system transmits a report, upon detecting a failure, that includes measurements for at least one of the TN cells or the NTN cells. In some cases, the operations of this step refer to, or may be performed by, measurement reporting circuitry as described with reference to FIG. 13.

In some aspects, the failure comprises a RLF, a CEF, or a HoF associated with a handover from an NTN cell to a TN cell, from a TN cell to an NTN cell, or from an NTN cell to an NTN cell. In some aspects, the report includes measurements for NTN cells only if the HoF failure is associated with a handover from an NTN cell to an NTN cell. In some aspects, the report includes an indication of whether a source primary cell, a failed primary cell, a reestablish primary cell, or a reconnect primary cell is part of a TN or NTN by including a satellite identifier or a flag.

In some aspects, the failure comprises an RLF and the report includes an NTN-specific RLF cause. In some aspects, the NTN-specific RLF cause comprises at least one of TAC update failure, a GNSS update failure, or a minimum elevation issue.

In some aspects, the report includes one or more configured CHO trigger conditions. In some aspects, the report includes at least one of time-based CHO conditions or related parameters; or location based CHO conditions or related parameters. In some aspects, the time-based CHO conditions or related parameters comprise at least one of: a time elapsed since an earliest time a CHO is allowed to be executed until a handover failure; an indication of whether a time range was sufficient for performing a CHO; an indication of whether the UE detected one or more candidate cells in the time range; or a list of one or more NTN cells detected in the time range.

In some aspects, the location-based CHO conditions or related parameters comprise at least one of: time spent by the UE in the location range; an indication of whether the UE detected one or more candidate cells in an area; a list of one or more NTN cells detected in the area; time spent by the UE in the area; or at least one of a difference in distance or difference in RSRP observed by the UE that did not meet a configured condition. In some aspects, the report indicates one or more CHO trigger conditions and the time difference when different CHO trigger condition that were met.

In some aspects, the failure comprises a CEF and the report includes at least one of: timestamp and location information, an identifier indicating whether a failed cell is broadcast as a potential target or future cell, an indication whether the failed cell is part of an NTN or TN, or a satellite identifier. In some aspects, the UE maintains separate CEF reports for TN cells and NTN cells.

In some aspects, the report comprises at least one RACH report entry for a RACH procedure for an NTN cell. In some aspects, the RACH report entry includes at least one of: an indication of PRACH resources related to a transmission of a first RACH message by the UE for the RACH procedure, a timestamp and location information to indicate when and where the UE performed a RACH procedure, whether the UE used a GNSS assisted TA common TA value for the RACH procedure, or an indication of whether the UE used a random access preamble reserved for UEs supporting GNSS or for UEs not supporting GNSS.

In some aspects, the RACH report entry includes at least one of: an indication of a LCH identity; a measured RTT value; a UE-specific service link RTT and broadcast RTT compensation value; time and frequency pre-compensation used by the UE for a PUSCH transmission; a measured elevation angle; or a backoff counter length configured at the UE for an initial RACH. In some aspects, the RACH report entry include NTN specific RA-purpose: TA report or TA update, if the RACH procedure was initiated for TA update.

In some aspects, the report comprises at least one CGI report including a satellite identifier corresponding to a CGI. In some aspects, the report also includes, for the NTN cell, at least one of: a timestamp, a UE to satellite delay, a TAC, or elevation angle. In some aspects, the TAC comprises one of multiple TACs broadcast for a same PCI; and the UE reports at least one of a current CGI based on a serving TAC or multiple CGIs based on the broadcast TACs.

In some aspects, the report comprises mobility information for the UE in the NTN cell; and the mobility information comprises at least one of a time when the UE connects to the NTN cell, a duration of time spent on the NTN cell, and initial and final location information during cell transitions.

In some aspects, the report includes UAC reporting information. In some aspects, the UAC reporting information comprises at least one of: time information of an access attempt; location information where the access attempt was made; TAC information and at least one of a PCI or a CGI of an access cell; or an access category, satellite identifier, or cell ID. In some aspects, the UAC reporting information comprises an indication of whether an access attempt failure results in the reselection to the TN.

Figure 13:
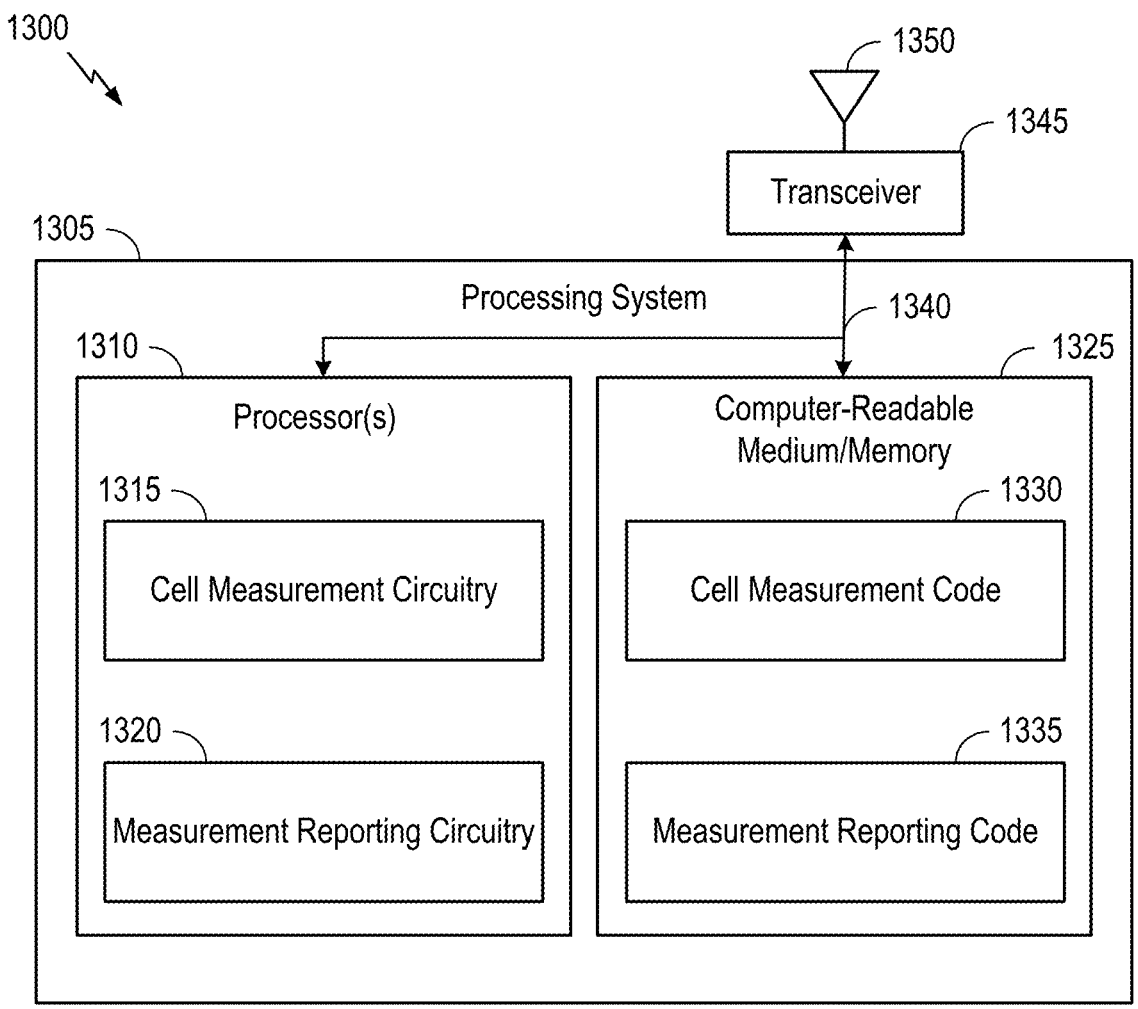
FIG. 13 shows an example of a communications device according to aspects of the present disclosure.

FIG. 13. depicts an example communications device 1300 that includes various components operable, configured, or adapted to perform operations for the techniques disclosed herein, such as the operations depicted and described with respect to FIG. 12. In some examples, communication device may be a user equipment 104 as described, for example with respect to FIGS. 1 and 2.

Communications device 1300 includes a processing system 1305 coupled to a transceiver 1345 (e.g., a transmitter and/or a receiver). Transceiver 1345 is configured to transmit (or send) and receive signals for the communications device 1300 via an antenna 1350, such as the various signals as described herein.

Processing system 1305 may be configured to perform processing functions for communications device 1300, including processing signals received and/or to be transmitted by communications device 1300. Processing system 1305 includes one or more processors 1310 coupled to a computer-readable medium/memory 1325 via a bus 1340.

In certain aspects, computer-readable medium/memory 1325 is configured to store instructions (e.g., computer-executable code) that when executed by the one or more processors 1310, cause the one or more processors 1310 to perform the operations illustrated in FIG. 12, or other operations for performing the various techniques discussed herein.

In one aspect, computer-readable medium/memory 1325 includes cell measurement code 1330 and measurement reporting code 1335.

Various components of communications device 1300 may provide means for performing the methods described herein, including with respect to FIG. 12.

In some examples, means for transmitting or sending (or means for outputting for transmission) may include the transceivers 254 and/or antenna(s) 252 of the user equipment 104 illustrated in FIG. 2 and/or transceiver 1345 and antenna 1350 of the communication device in FIG. 13.

In some examples, means for receiving (or means for obtaining) may include the transceivers 254 and/or antenna(s) 252 of the user equipment 104 illustrated in FIG. 2 and/or transceiver 1345 and antenna 1350 of the communication device in FIG. 13.

In some examples, means for determining, deciding, and/or selecting may include various processing system 1305 components, such as: the one or more processors 1310 in FIG. 13, or aspects of the user equipment 104 depicted in FIG. 2, including receive processor 258, transmit processor 264, TX MIMO processor 266, and/or controller/processor 280.

In one aspect, one or more processors 1310 includes cell measurement circuitry 1315 and measurement reporting circuitry 1320. According to some aspects, cell measurement circuitry 1315 takes measurements for one or more TN cells and one or more NTN cells. According to some aspects, measurement reporting circuitry 1320 transmits a report, upon detecting a failure, that includes measurements for at least one of the TN cells or the NTN cells.

In some aspects, the failure includes a RLF, a CEF, or a HoF associated with a handover from an NTN cell to a TN cell, from a TN cell to an NTN cell, or from an NTN cell to an NTN cell. In some aspects, the report includes measurements for NTN cells only if the HoF failure is associated with a handover from an NTN cell to an NTN cell. In some aspects, the report includes an indication of whether a source primary cell, a failed primary cell, a reestablish primary cell, or a reconnect primary cell is part of a TN or NTN by including a satellite identifier or a flag. In some aspects, the failure includes an RLF and the report includes an NTN-specific RLF cause. In some aspects, the NTN-specific RLF cause includes at least one of TAC update failure, a GNSS update failure, or a minimum elevation issue.

In some aspects, the report includes one or more configured CHO trigger conditions. In some aspects, the report includes at least one of time-based CHO conditions or related parameters; or location based CHO conditions or related parameters. In some aspects, the time-based CHO conditions or related parameters include at least one of: a time elapsed since an earliest time a CHO is allowed to be executed until a handover failure; an indication of whether a time range was sufficient for performing a CHO; an indication of whether the UE detected one or more candidate cells in the time range; or a list of one or more NTN cells detected in the time range. In some aspects, the location-based CHO conditions or related parameters include at least one of: time spent by the UE in the location range; an indication of whether the UE detected one or more candidate cells in an area; a list of one or more NTN cells detected in the area; time spent by the UE in the area; or at least one of a difference in distance or difference in RSRP observed by the UE that did not meet a configured condition.

In some aspects, the report indicates one or more CHO trigger conditions and the time difference when different CHO trigger condition that were met. In some aspects, the failure includes a CEF and the report includes at least one of: timestamp and location information, an identifier indicating whether a failed cell is broadcast as a potential target or future cell, an indication whether the failed cell is part of an NTN or TN, or a satellite identifier. In some aspects, the UE maintains separate CEF reports for TN cells and NTN cells. In some aspects, the report includes at least one RACH report entry for a RACH procedure for an NTN cell. In some aspects, the RACH report entry includes at least one of: an indication of PRACH resources related to a transmission of a first RACH message by the UE for the RACH procedure, a timestamp and location information to indicate when and where the UE performed a RACH procedure, whether the UE used a GNSS assisted TA common TA value for the RACH procedure, or an indication of whether the UE used a random access preamble reserved for UEs supporting GNSS or for UEs not supporting GNSS. In some aspects, the RACH report entry includes at least one of: an indication of a LCH identity; a measured RTT value; a UE-specific service link RTT and broadcast RTT compensation value; time and frequency pre-compensation used by the UE for a PUSCH transmission; a measured elevation angle; or a backoff counter length configured at the UE for an initial RACH. In some aspects, the RACH report entry include NTN specific RA-purpose: TA report or TA update, if the RACH procedure was initiated for TA update.

In some aspects, the report includes at least one CGI report including a satellite identifier corresponding to a CGI. In some aspects, the report also includes, for the NTN cell, at least one of: a timestamp, a UE to satellite delay, a TAC, or elevation angle. In some aspects, the TAC includes one of multiple TACs broadcast for a same PCI; and the UE reports at least one of a current CGI based on a serving TAC or multiple CGIs based on the broadcast TACs. In some aspects, the report includes mobility information for the UE in the NTN cell; and the mobility information includes at least one of a time when the UE connects to the NTN cell, a duration of time spent on the NTN cell, and initial and final location information during cell transitions.

In some aspects, the report includes UAC reporting information. In some aspects, the UAC reporting information includes at least one of: time information of an access attempt; location information where the access attempt was made; TAC information and at least one of a PCI or a CGI of an access cell; or an access category, satellite identifier, or cell ID. In some aspects, the UAC reporting information includes an indication of whether an access attempt failure results in the reselection to the TN.

Notably, FIG. 13 is just use example, and many other examples and configurations of communication device are possible.

Figure 14:
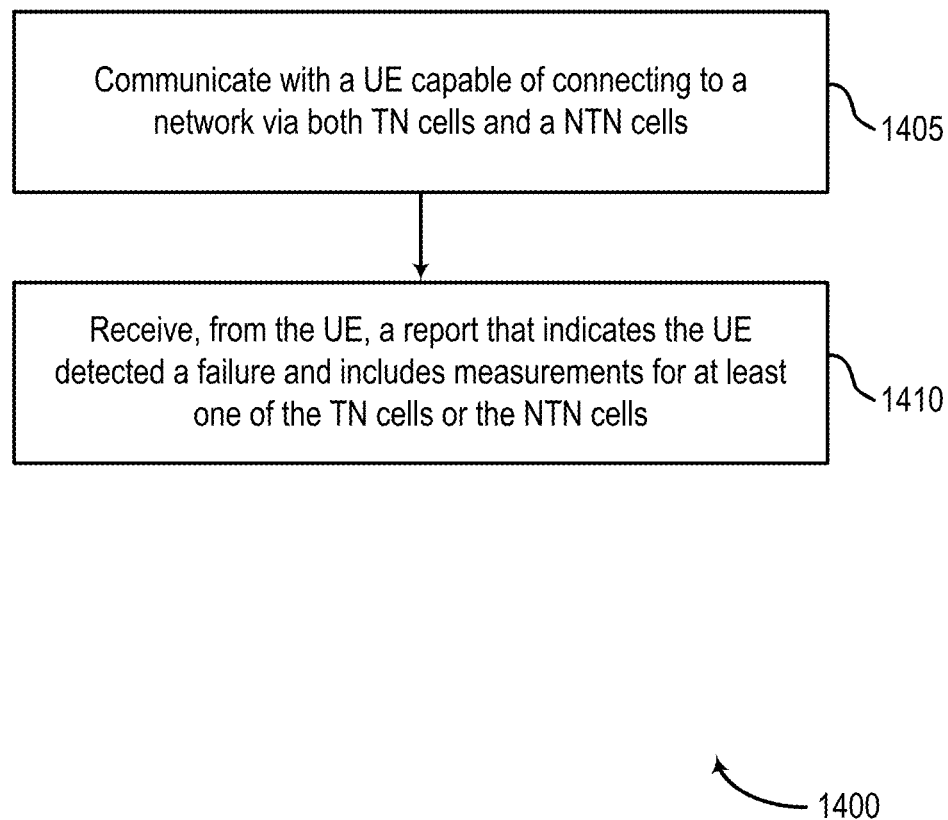
FIG. 14 shows an example method for data collection reporting for TN cells and NTN cells according to aspects of the present disclosure.

FIG. 14 shows an example of a method 1400 for data collection reporting for TN cells and NTN cells according to aspects of the present disclosure. In some aspects, a base station, such as base station 102 of FIGS. 1 and 2, or processing system 1505 of FIG. 15, may perform the method 1400.

At operation 1405, the system communicates with a UE capable of connecting to a network via both TN cells and a NTN cells. In some cases, the operations of this step refer to, or may be performed by, UE communication circuitry as described with reference to FIG. 15.

At operation 1410, the system receives, from the UE, a report that indicates the UE detected a failure and includes measurements for at least one of the TN cells or the NTN cells. In some cases, the operations of this step refer to, or may be performed by, UE measurement report circuitry as described with reference to FIG. 15.

In some aspects, the failure comprises a RLF; a CEF; or a HoF associated with a handover from an NTN cell to a TN cell, from a TN cell to an NTN cell, or from an NTN cell to an NTN cell. In some aspects, the report includes measurements for NTN cells only if the HoF failure is associated with a handover from an NTN cell to an NTN cell. In some aspects, the report includes an indication of whether a source primary cell, a failed primary cell, a reestablish primary cell, or a reconnect primary cell is part of a TN or NTN by including a satellite identifier or a flag.

In some aspects, the failure comprises an RLF and the report includes an NTN-specific RLF cause. In some aspects, the NTN-specific RLF cause comprises at least one of a TAC update failure, a GNSS update failure, or a minimum elevation issue.

In some aspects, the report includes one or more configured CHO trigger conditions. In some aspects, the report includes at least one of: time-based CHO conditions or related parameters; or location based CHO conditions or related parameters. In some aspects, the time-based CHO conditions or related parameters comprise at least one of: a time elapsed since an earliest time a CHO is allowed to be executed until a handover failure; an indication of whether a time range was sufficient for performing a CHO; an indication of whether the UE detected one or more candidate cells in the time range; or a list of one or more NTN cells detected in the time range. In some aspects, the location-based CHO conditions or related parameters comprise at least one of: time spent by the UE in the location range; an indication of whether the UE detected one or more candidate cells in an area; a list of one or more NTN cells detected in the area; time spent by the UE in the area; or at least one of a difference in distance or difference in RSRP observed by the UE that did not meet a configured condition. In some aspects, the report indicates one or more CHO trigger conditions and the time difference when different CHO trigger condition that were met.

In some aspects, the failure comprises a CEF and the report includes at least one of: timestamp and location information, an identifier indicating whether a failed cell is broadcast as a potential target or future cell, an indication whether the failed cell is part of an NTN or TN, or a satellite identifier. In some aspects, the network entity receives separate CEF reports for TN cells and NTN cells.

In some aspects, the report comprises at least one RACH report entry for a RACH procedure for an NTN cell. In some aspects, the RACH report entry includes at least one of: an indication of PRACH resources related to a transmission of a first RACH message by the UE for the RACH procedure, a timestamp and location information to indicate when and where the UE performed a RACH procedure, whether the UE used a GNSS assisted TA common TA value for the RACH procedure, or an indication of whether the UE used a random access preamble reserved for UEs supporting GNSS or for UEs not supporting GNSS.

In some aspects, the RACH report entry includes at least one of: an indication of a LCH identity; a measured RTT value; a UE-specific service link RTT and broadcast RTT compensation value; time and frequency pre-compensation used by the UE for a PUSCH transmission; a measured elevation angle; or a backoff counter length configured at the UE for an initial RACH. In some aspects, the RACH report entry include NTN specific RA-purpose: TA report or TA update, if the RACH procedure was initiated for TA update.

In some aspects, the report comprises at least one CGI report including a satellite identifier corresponding to a CGI. In some aspects, the report also includes, for the NTN cell, at least one of: a timestamp, a UE to satellite delay, a TAC, or elevation angle. In some aspects, the TAC comprises one of multiple TACs broadcast for a same PCI; and the UE reports at least one of a current CGI based on a serving TAC or multiple CGIs based on the broadcast TACs.

In some aspects, the report comprises mobility information for the UE in the NTN cell; and the mobility information comprises at least one of a time when the UE connects to the NTN cell, a duration of time spent on the NTN cell, and initial and final location information during cell transitions.

In some aspects, the report includes UAC reporting information. In some aspects, the UAC reporting information comprises at least one of: time information of an access attempt; location information where the access attempt was made; TAC information and at least one of a PCI or a CGI of an access cell; or an access category, satellite identifier, or cell ID. In some aspects, the UAC reporting information comprises an indication of whether an access attempt failure results in the reselection to the TN.

Figure 15:
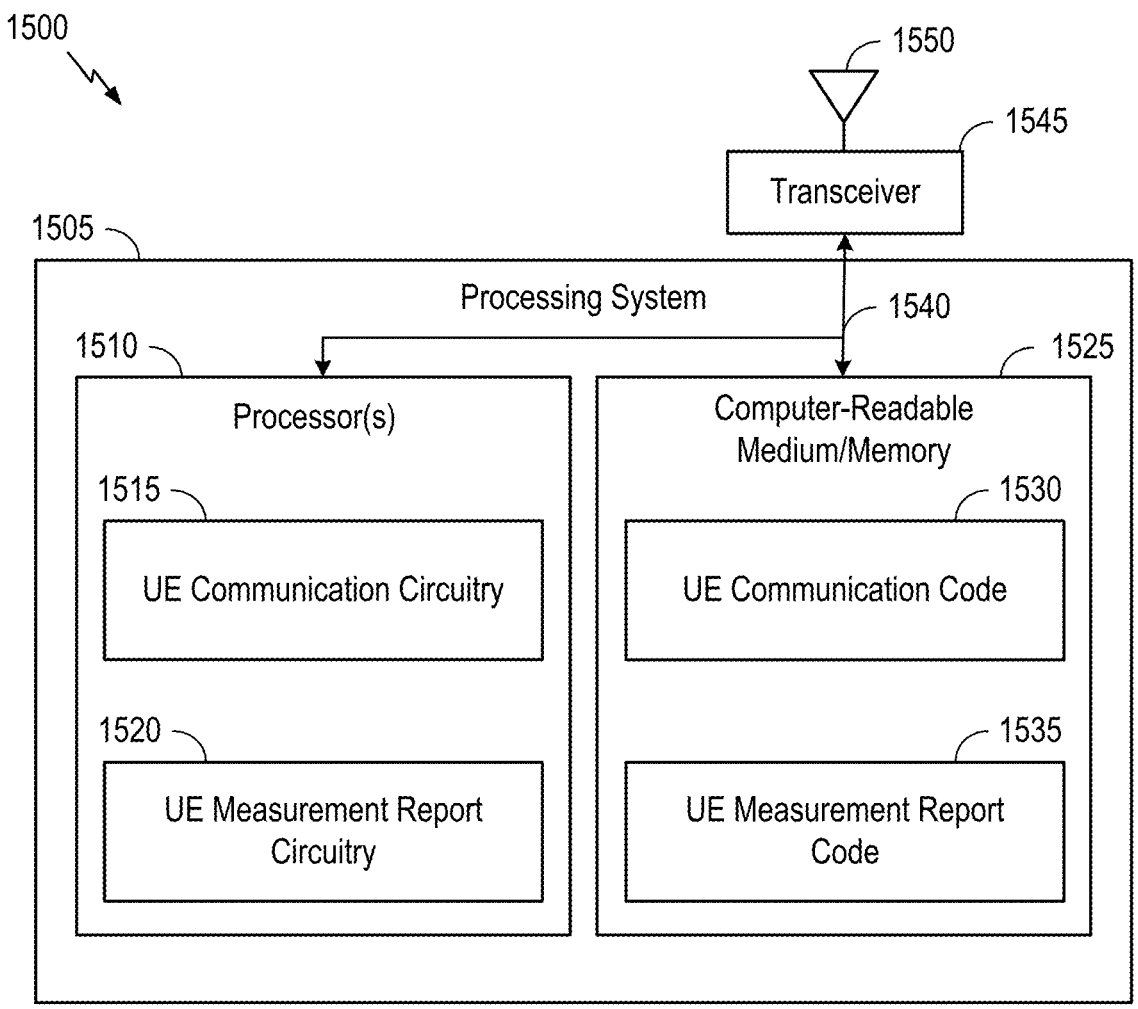
FIG. 15 shows an example of a communications device according to aspects of the present disclosure.

FIG. 15 depicts an example communications device 1500 that includes various components operable, configured, or adapted to perform operations for the techniques disclosed herein, such as the operations depicted and described with respect to FIG. 14. In some examples, communication device may be a base station 102 as described, for example with respect to FIGS. 1 and 2.

Communications device 1500 includes a processing system 1505 coupled to a transceiver 1545 (e.g., a transmitter and/or a receiver). Transceiver 1545 is configured to transmit (or send) and receive signals for the communications device 1500 via an antenna 1550, such as the various signals as described herein. Processing system 1505 may be configured to perform processing functions for communications device 1500, including processing signals received and/or to be transmitted by communications device 1500.

Processing system 1505 includes one or more processors 1510 coupled to a computer-readable medium/memory 1525 via a bus 1540. Processing system 1505 may be configured to perform processing functions for communications device 1500, including processing signals received and/or to be transmitted by communications device 1500. Processing system 1505 includes one or more processors 1510 coupled to a computer-readable medium/memory 1525 via a bus 1540.

In certain aspects, computer-readable medium/memory 1525 is configured to store instructions (e.g., computer-executable code) that when executed by the one or more processors 1510, cause the one or more processors 1510 to perform the operations illustrated in FIG. 14, or other operations for performing the various techniques discussed herein.

In one aspect, computer-readable medium/memory 1525 includes UE communication code 1530 and UE measurement report code 1535.

Various components of communications device 1500 may provide means for performing the methods described herein, including with respect to FIG. 14.

In some examples, means for transmitting or sending (or means for outputting for transmission) may include the transceivers 232 and/or antenna(s) 234 of the base station 102 illustrated in FIG. 2 and/or transceiver 1545 and antenna 1550 of the communication device in FIG. 15.

In some examples, means for receiving (or means for obtaining) may include the transceivers 232 and/or antenna(s) 234 of the base station 102 illustrated in FIG. 2 and/or transceiver 1545 and antenna 1550 of the communication device in FIG. 15

In some examples, means for determining, deciding, and/or selecting may include various processing system 1505 components, such as: the one or more processors 1510 in FIG. 15, or aspects of the base station 102 depicted in FIG. 2, including receive processor 238, transmit processor 220, TX MIMO processor 230, and/or controller/processor 240.

In one aspect, one or more processors 1510 includes UE communication circuitry 1515 and UE measurement report circuitry 1520. According to some aspects, UE communication circuitry 1515 communicates with a UE capable of connecting to a network via both TN cells and a NTN cells. According to some aspects, UE measurement report circuitry 1520 receives, from the UE, a report that indicates the UE detected a failure and includes measurements for at least one of the TN cells or the NTN cells.

In some aspects, the failure includes a RLF; a CEF; or a HoF associated with a handover from an NTN cell to a TN cell, from a TN cell to an NTN cell, or from an NTN cell to an NTN cell. In some aspects, the report includes measurements for NTN cells only if the HoF failure is associated with a handover from an NTN cell to an NTN cell. In some aspects, the report includes an indication of whether a source primary cell, a failed primary cell, a reestablish primary cell, or a reconnect primary cell is part of a TN or NTN by including a satellite identifier or a flag. In some aspects, the failure includes an RLF and the report includes an NTN-specific RLF cause. In some aspects, the NTN-specific RLF cause includes at least one of a TAC update failure, a GNSS update failure, or a minimum elevation issue.

In some aspects, the report includes one or more configured CHO trigger conditions. In some aspects, the report includes at least one of: time-based CHO conditions or related parameters; or location based CHO conditions or related parameters. In some aspects, the time-based CHO conditions or related parameters include at least one of: a time elapsed since an earliest time a CHO is allowed to be executed until a handover failure; an indication of whether a time range was sufficient for performing a CHO; an indication of whether the UE detected one or more candidate cells in the time range; or a list of one or more NTN cells detected in the time range. In some aspects, the location-based CHO conditions or related parameters include at least one of: time spent by the UE in the location range; an indication of whether the UE detected one or more candidate cells in an area; a list of one or more NTN cells detected in the area; time spent by the UE in the area; or at least one of a difference in distance or difference in RSRP observed by the UE that did not meet a configured condition. In some aspects, the report indicates one or more CHO trigger conditions and the time difference when different CHO trigger condition that were met.

In some aspects, the failure includes a CEF and the report includes at least one of: timestamp and location information, an identifier indicating whether a failed cell is broadcast as a potential target or future cell, an indication whether the failed cell is part of an NTN or TN, or a satellite identifier. In some aspects, the network entity receives separate CEF reports for TN cells and NTN cells. In some aspects, the report includes at least one RACH report entry for a RACH procedure for an NTN cell. In some aspects, the RACH report entry includes at least one of: an indication of PRACH resources related to a transmission of a first RACH message by the UE for the RACH procedure, a timestamp and location information to indicate when and where the UE performed a RACH procedure, whether the UE used a GNSS assisted TA common TA value for the RACH procedure, or an indication of whether the UE used a random access preamble reserved for UEs supporting GNSS or for UEs not supporting GNSS. In some aspects, the RACH report entry includes at least one of: an indication of a LCH identity; a measured RTT value; a UE-specific service link RTT and broadcast RTT compensation value; time and frequency pre-compensation used by the UE for a PUSCH transmission; a measured elevation angle; or a backoff counter length configured at the UE for an initial RACH. In some aspects, the RACH report entry include NTN specific RA-purpose: TA report or TA update, if the RACH procedure was initiated for TA update. In some aspects, the report includes at least one CGI report including a satellite identifier corresponding to a CGI.

In some aspects, the report also includes, for the NTN cell, at least one of: a timestamp, a UE to satellite delay, a TAC, or elevation angle. In some aspects, the TAC includes one of multiple TACs broadcast for a same PCI; and the UE reports at least one of a current CGI based on a serving TAC or multiple CGIs based on the broadcast TACs. In some aspects, the report includes mobility information for the UE in the NTN cell; and the mobility information includes at least one of a time when the UE connects to the NTN cell, a duration of time spent on the NTN cell, and initial and final location information during cell transitions. In some aspects, the report includes UAC reporting information. In some aspects, the UAC reporting information includes at least one of: time information of an access attempt; location information where the access attempt was made; TAC information and at least one of a PCI or a CGI of an access cell; or an access category, satellite identifier, or cell ID. In some aspects, the UAC reporting information includes an indication of whether an access attempt failure results in the reselection to the TN.

Notably, FIG. 15 is just use example, and many other examples and configurations of communication device are possible.

Figure 16:
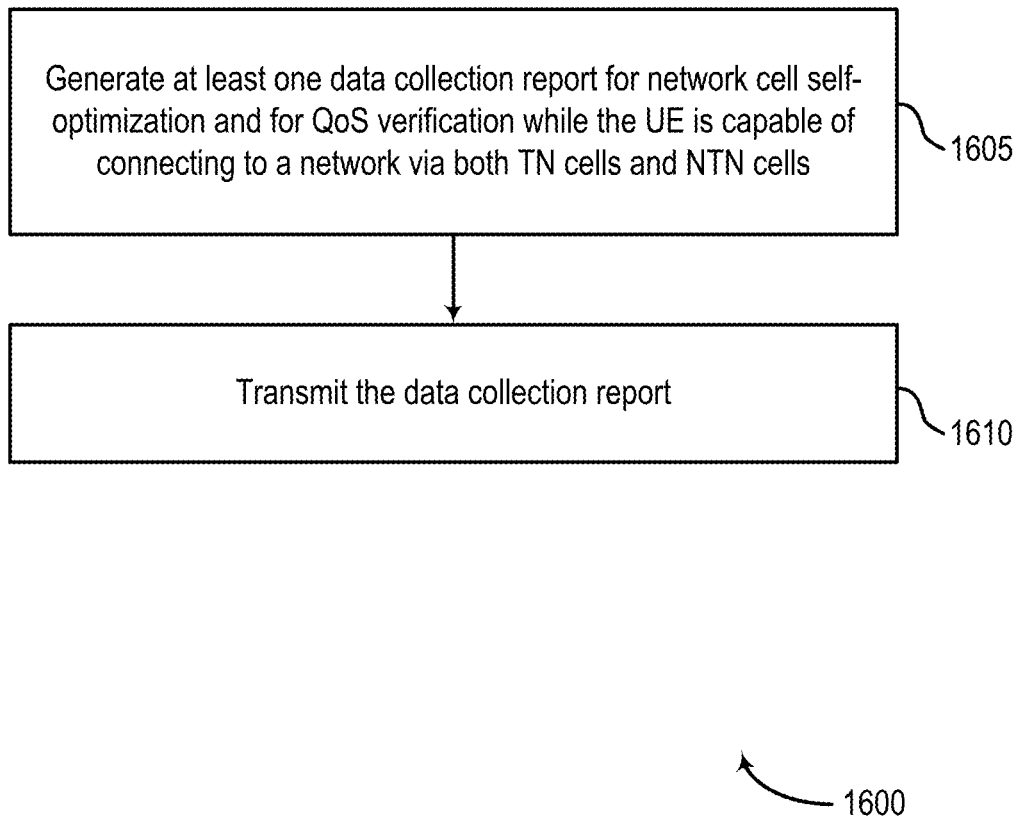
FIG. 16 shows an example method for data collection reporting for TN cells and NTN cells according to aspects of the present disclosure.

FIG. 16 shows an example of a method 1600 for data collection reporting for TN cells and NTN cells according to aspects of the present disclosure. In some aspects, a user equipment, such as UE 104 of FIGS. 1 and 2, a base station, such as base station 102 of FIGS. 1 and 2, or processing system 1705 of FIG. 17, may perform the method 1600.

At operation 1605, the system generates at least one data collection report for network cell self-optimization and for QoS verification while the UE is capable of connecting to a network via both TN cells and NTN cells. In some cases, the operations of this step refer to, or may be performed by, network cell reporting circuitry as described with reference to FIG. 17.

At operation 1610, the system transmits the data collection report. In some cases, the operations of this step refer to, or may be performed by, information reporting circuitry as described with reference to FIG. 17.

In some aspects, the data collection report comprises a MDT report. In some aspects, the data collection report comprises a MDT report Containing measurements in IDLE and INACTIVE state that includes at least one of: radio measurements of TN and NTN cells depending upon the UE capability; an indication of whether a camped cell is part of an NTN or TN; a satellite identifier if a capped cell or neighboring cell is part of NTN; or a cell visibility time or cell switch-off time of a particular satellite or frequency or PCID. In some aspects, the MDT report additionally include at least one of: an indication of whether camped cells and neighboring cell are visible with timestamps; or a list of TACs.

In some aspects, the data collection report comprises an MDT report. In some aspects, the MDT report indicates, for one or more NTN cells, at least one of: data volume, UE uplink throughput, UE downlink throughput, downlink delay, uplink delay, downlink packet loss, or uplink packet loss. In some aspects, the data volume, UE uplink throughput, UE downlink throughput, downlink delay, uplink delay, downlink packet loss, or uplink packet loss are obtained separately based on the information whether the HARQ issue was detected in uplink or downlink, or not.

In some aspects, the MDT report indicates, for RRM measurement of one or more NTN cells, at least one of: cell and beam level measurements with a satellite identifier or flag to indicate cell and beam measurements correspond to NTN cell, which configured cell or frequency was not detected in a configured master group or with configured MTC window, or how long a physical cell ID or frequency was detected within the configured MTC window.

In some aspects, the MDT report indicates at least one of: an average, minimum, maximum, median, histogram, or excess propagation delay or differential delay measured by the UE in a measurement period.

In some aspects, the MDT report indicates at least one HARQ issue for at least one of uplink or downlink, if the HARQ issue is detected more than a threshold number of times. In some aspects, the MDT report indicates which HARQ processes were successful.

Figure 17:
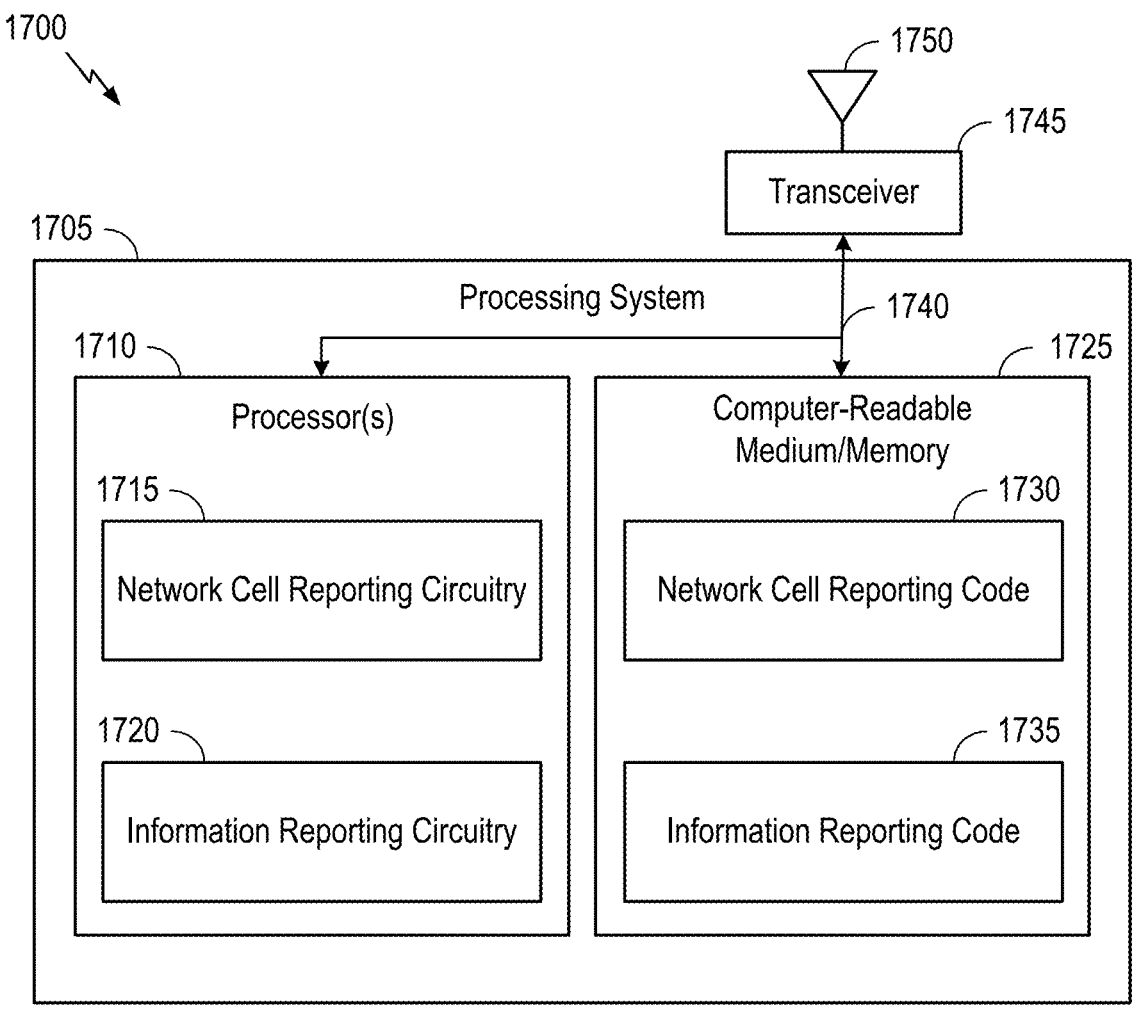
FIG. 17 shows an example of a communications device according to aspects of the present disclosure.

FIG. 17 depicts an example communications device 1700 that includes various components operable, configured, or adapted to perform operations for the techniques disclosed herein, such as the operations depicted and described with respect to FIG. 16. In some examples, communication device may be a base station 102 and/or a user equipment 104 as described, for example with respect to FIGS. 1 and 2.

Communications device 1700 includes a processing system 1705 coupled to a transceiver 1745 (e.g., a transmitter and/or a receiver). Transceiver 1745 is configured to transmit (or send) and receive signals for the communications device 1700 via an antenna 1750, such as the various signals as described herein.

Processing system 1705 may be configured to perform processing functions for communications device 1700, including processing signals received and/or to be transmitted by communications device 1700. Processing system 1705 includes one or more processors 1710 coupled to a computer-readable medium/memory 1725 via a bus 1740.

In certain aspects, computer-readable medium/memory 1725 is configured to store instructions (e.g., computer-executable code) that when executed by the one or more processors 1710, cause the one or more processors 1710 to perform the operations illustrated in FIG. 16, or other operations for performing the various techniques discussed herein.

In one aspect, computer-readable medium/memory 1725 includes network cell reporting code 1730 and information reporting code 1735.

Various components of communications device 1700 may provide means for performing the methods described herein, including with respect to FIG. 16.

In some examples, means for transmitting or sending (or means for outputting for transmission) may include the transceivers 254 and/or antenna(s) 252 of the user equipment 104 illustrated in FIG. 2 and/or transceiver 1345 and antenna 1350 of the communication device in FIG. 17.

In some examples, means for receiving (or means for obtaining) may include the transceivers 254 and/or antenna(s) 252 of the user equipment 104 illustrated in FIG. 2 and/or transceiver 1345 and antenna 1350 of the communication device in FIG. 17.

In some examples, means for determining, deciding, and/or selecting may include various processing system 1305 components, such as: the one or more processors 1310 in FIG. 17, or aspects of the user equipment 104 depicted in FIG. 2, including receive processor 258, transmit processor 264, TX MIMO processor 266, and/or controller/processor 280.

In one aspect, one or more processors 1710 includes network cell reporting circuitry 1715 and information reporting circuitry 1720. According to some aspects, network cell reporting circuitry 1715 generates at least one data collection report for network cell self-optimization and for QoS verification while the UE is capable of connecting to a network via both TN cells and NTN cells. According to some aspects, information reporting circuitry 1720 transmits the data collection report.

In some aspects, the data collection report includes a MDT report. In some aspects, the data collection report includes a MDT report Containing measurements in IDLE and INACTIVE state that includes at least one of: radio measurements of TN and NTN cells depending upon the UE capability; an indication of whether a camped cell is part of an NTN or TN; a satellite identifier if a capped cell or neighboring cell is part of NTN; or a cell visibility time or cell switch-off time of a particular satellite or frequency or PCID.

In some aspects, the MDT report additionally include at least one of: an indication of whether camped cells and neighboring cell are visible with timestamps; or a list of TACs. In some aspects, the data collection report includes an MDT report. In some aspects, the MDT report indicates, for one or more NTN cells, at least one of: data volume, UE uplink throughput, UE downlink throughput, downlink delay, uplink delay, downlink packet loss, or uplink packet loss. In some aspects, the data volume, UE uplink throughput, UE downlink throughput, downlink delay, uplink delay, downlink packet loss, or uplink packet loss are obtained separately based on the information whether the HARQ issue was detected in uplink or downlink, or not.

In some aspects, the MDT report indicates, for RRM measurement of one or more NTN cells, at least one of: cell and beam level measurements with a satellite identifier or flag to indicate cell and beam measurements correspond to NTN cell, which configured cell or frequency was not detected in a configured master group or with configured MTC window, or how long a physical cell ID or frequency was detected within the configured MTC window. In some aspects, the MDT report indicates at least one of: an average, minimum, maximum, median, histogram, or excess propagation delay or differential delay measured by the UE in a measurement period. In some aspects, the MDT report indicates at least one HARQ issue for at least one of uplink or downlink, if the HARQ issue is detected more than a threshold number of times. In some aspects, the MDT report indicates which HARQ processes were successful.

Notably, FIG. 17 is just use example, and many other examples and configurations of communication device are possible.

Example Clauses

Implementation examples are described in the following numbered clauses:

Clause 1: A method of wireless communication by a UE, comprising: transmitting an indication of a capability of the UE to connect to a network via both TN cells and NTN cells; and transmitting one or more data collection reports in accordance with the indicated capability.

Clause 2: The method of Clause 1, wherein: the data collection reports comprise data collection reports for at least one of: network self-configuration or network self-optimization.

Clause 3: The method of any one of Clauses 1-2, wherein: for data collection reports that include measurements for an NTN cell, the UE includes a satellite identifier corresponding to the NTN cell or an identification that differentiate NTN cell from TN cell.

Clause 4: The method of any one of Clauses 1-3, further comprising: receiving signaling indicating whether the UE is to send one or more of the data collection reports via a TN cell, via an NTN cell, or via both TN and NTN cells.

Clause 5: The method of Clause 4, wherein: the signaling indicates one or more trigger events for at least one of handover between an NTN cell and a TN cell or handover between a TN cell and an NTN cell.

Clause 6: The method of Clause 4, wherein: the signaling indicates that data collection reports including TN and NTN cell measurement are to be sent via a TN cell, that data collection reports including only NTN cell measurements are to be sent via an NTN cell, or both.

Clause 7: The method of any one of Clauses 1-6, wherein: the UE separately indicates availability of data collection reports for TN cells and NTN cells.

Clause 8: The method of Clause 7, further comprising: receiving a request for a data collection report for NTN cells only; and sending a data collection report that includes entries for NTN cells only, in response to the request.

Clause 9: The method of any one of Clauses 1-8, wherein: the capability indicated by the UE indicates at least one of: whether the UE is able to report data collection reports, for one or more NTN cells, via a TN cell; or whether the UE is able to report data collection reports, for one or more TN cells, via an NTN cell.

Clause 10: The method of any one of Clauses 1-9, wherein: transmitting one or more data collection reports comprises transmitting the one or more data collection reports to a TCE via a user plane.

Clause 11: The method of Clause 10, further comprising: receiving at least one of an IP address of the TCE or a URL for the TCE; and transmitting the one or more data collection reports to the TCE address or URL, via at least one of a TN cell, an NTN cell, or a LAN.

Clause 12: A method of wireless communication by a network entity, comprising: receiving, from a UE, an indication of a capability of the UE to connect to a network via both TN cells and NTN cells; and receiving one or more data collection reports from the UE in accordance with the indicated capability.

Clause 13: The method of Clause 12, wherein: the data collection reports comprise data collection reports for at least one of: network self-configuration or network self-optimization.

Clause 14: The method of any one of Clauses 12-13, wherein: the data collection reports that include measurements for an NTN cell also include a satellite identifier corresponding to the NTN cell or an identification that differentiate NTN cell from TN cell.

Clause 15: The method of any one of Clauses 12-14, further comprising: transmitting signaling, to the UE, indicating whether the UE is to send one or more of the data collection reports via a TN cell, via an NTN cell, or via both NT and NTN cells.

Clause 16: The method of Clause 15, wherein: the signaling indicates one or more trigger events for at least one of handover between an NTN cell and a TN cell or handover between a TN cell and an NTN cell.

Clause 17: The method of Clause 15, wherein: the signaling indicates that data collection reports including TN and NTN cell measurement are to be sent via a TN cell, that data collection reports including only NTN cell measurements are to be sent via an NTN cell, or both.

Clause 18: The method of any one of Clauses 12-17, wherein: the UE separately indicates availability of data collection reports for TN cells and NTN cells.

Clause 19: The method of Clause 18, further comprising: transmitting the UE a request for a data collection report for NTN cells only; and receiving a data collection report that includes entries for NTN cells only, in response to the request.

Clause 20: The method of any one of Clauses 12-19, wherein: the capability indicated by the UE indicates at least one of: whether UE the UE is able to report data collection reports, for one or more NTN cells, via a TN cell; or whether UE the UE is able to report data collection reports, for one or more TN cells, via an NTN cell.

Clause 21: The method of any one of Clauses 12-20, further comprising: receiving one or more data collection reports comprises receiving the one or more data collection reports sent to a TCE via a user plane.

Clause 22: The method of Clause 21, further comprising: transmitting, to the UE, at least one of an IP address of the TCE or a URL for the TCE; and receiving the one or more data collection reports to the TCE address or URL, via at least one of a TN cell, an NTN cell, or a LAN.

Clause 23: A method of wireless communication by a UE, comprising: taking measurements for one or more TN cells and one or more NTN cells; and transmitting a report, upon detecting a failure, that includes measurements for at least one of the TN cells or the NTN cells.

Clause 24: The method of Clause 23, wherein: the failure comprises a RLF, a CEF, or a HoF associated with a handover from an NTN cell to a TN cell, from a TN cell to an NTN cell, or from an NTN cell to an NTN cell.

Clause 25: The method of Clause 24, wherein: the report includes measurements for NTN cells only if the HoF failure is associated with a handover from an NTN cell to an NTN cell.

Clause 26: The method of Clause 24, wherein: the report includes an indication of whether a source primary cell, a failed primary cell, a reestablish primary cell, or a reconnect primary cell is part of a TN or NTN by including a satellite identifier or a flag.

Clause 27: The method of Clause 24, wherein: the failure comprises an RLF and the report includes an NTN-specific RLF cause.

Clause 28: The method of Clause 27, wherein: the NTN-specific RLF cause comprises at least one of TAC update failure, a GNSS update failure, or a minimum elevation issue.

Clause 29: The method of Clause 24, wherein: the report includes one or more configured CHO trigger conditions.

Clause 30: The method of Clause 29, wherein: the report includes at least one of time-based CHO conditions or related parameters; or location based CHO conditions or related parameters.

Clause 31: The method of Clause 30, wherein: the time-based CHO conditions or related parameters comprise at least one of: a time elapsed since an earliest time a CHO is allowed to be executed until a handover failure; an indication of whether a time range was sufficient for performing a CHO; an indication of whether the UE detected one or more candidate cells in the time range; or a list of one or more NTN cells detected in the time range.

Clause 32: The method of Clause 30, wherein: the location-based CHO conditions or related parameters comprise at least one of: time spent by the UE in the location range; an indication of whether the UE detected one or more candidate cells in an area; a list of one or more NTN cells detected in the area; time spent by the UE in the area; or at least one of a difference in distance or difference in RSRP observed by the UE that did not meet a configured condition.

Clause 33: The method of Clause 30, wherein: the report indicates one or more CHO trigger conditions and the time difference when different CHO trigger condition that were met.

Clause 34: The method of Clause 24, wherein: the failure comprises a CEF and the report includes at least one of: timestamp and location information, an identifier indicating whether a failed cell is broadcast as a potential target or future cell, an indication whether the failed cell is part of an NTN or TN, or a satellite identifier.

Clause 35: The method of Clause 34, wherein: the UE maintains separate CEF reports for TN cells and NTN cells.

Clause 36: The method of any one of Clauses 23-35, wherein: the report comprises at least one RACH report entry for a RACH procedure for an NTN cell.

Clause 37: The method of Clause 36, wherein: the RACH report entry includes at least one of: an indication of PRACH resources related to a transmission of a first RACH message by the UE for the RACH procedure, a timestamp and location information to indicate when and where the UE performed a RACH procedure, whether the UE used a GNSS assisted TA common TA value for the RACH procedure, or an indication of whether the UE used a random access preamble reserved for UEs supporting GNSS or for UEs not supporting GNSS.

Clause 38: The method of Clause 36, wherein: the RACH report entry includes at least one of: an indication of a LCH identity; a measured RTT value; a UE-specific service link RTT and broadcast RTT compensation value; time and frequency pre-compensation used by the UE for a PUSCH transmission; a measured elevation angle; or a backoff counter length configured at the UE for an initial RACH.

Clause 39: The method of Clause 36, wherein: the RACH report entry include NTN specific RA-purpose: TA report or TA update, if the RACH procedure was initiated for TA update.

Clause 40: The method of any one of Clauses 23-39, wherein: the report comprises at least one CGI report including a satellite identifier corresponding to a CGI.

Clause 41: The method of any one of Clauses 23-40, wherein: the report also includes, for the NTN cell, at least one of: a timestamp, a UE to satellite delay, a TAC, or elevation angle.

Clause 42: The method of Clause 41, wherein: the TAC comprises one of multiple TACs broadcast for a same PCI; and the UE reports at least one of a current CGI based on a serving TAC or multiple CGIs based on the broadcast TACs.

Clause 43: The method of any one of Clauses 23-42, wherein: the report comprises mobility information for the UE in the NTN cell; and the mobility information comprises at least one of a time when the UE connects to the NTN cell, a duration of time spent on the NTN cell, and initial and final location information during cell transitions.

Clause 44: The method of any one of Clauses 23-43, wherein: the report includes UAC reporting information.

Clause 45: The method of Clause 44, wherein: the UAC reporting information comprises at least one of: time information of an access attempt; location information where the access attempt was made; TAC information and at least one of a PCI or a CGI of an access cell; or an access category, satellite identifier, or cell ID.

Clause 46: The method of Clause 44, wherein: the UAC reporting information comprises an indication of whether an access attempt failure results in the reselection to the TN.

Clause 47: A method of wireless communication by a network entity, comprising: communicating with a UE capable of connecting to a network via both TN cells and a NTN cells; and receiving, from the UE, a report that indicates the UE detected a failure and includes measurements for at least one of the TN cells or the NTN cells.

Clause 48: The method of Clause 47, wherein: the failure comprises a RLF; a CEF; or a HoF associated with a handover from an NTN cell to a TN cell, from a TN cell to an NTN cell, or from an NTN cell to an NTN cell.

Clause 49: The method of Clause 48, wherein: the report includes measurements for NTN cells only if the HoF failure is associated with a handover from an NTN cell to an NTN cell.

Clause 50: The method of Clause 48, wherein: the report includes an indication of whether a source primary cell, a failed primary cell, a reestablish primary cell, or a reconnect primary cell is part of a TN or NTN by including a satellite identifier or a flag.

Clause 51: The method of Clause 48, wherein: the failure comprises an RLF and the report includes an NTN-specific RLF cause.

Clause 52: The method of Clause 51, wherein: the NTN-specific RLF cause comprises at least one of a TAC update failure, a GNSS update failure, or a minimum elevation issue.

Clause 53: The method of Clause 48, wherein: the report includes one or more configured CHO trigger conditions.

Clause 54: The method of Clause 53, wherein: the report includes at least one of: time-based CHO conditions or related parameters; or location based CHO conditions or related parameters.

Clause 55: The method of Clause 54, wherein: the time-based CHO conditions or related parameters comprise at least one of: a time elapsed since an earliest time a CHO is allowed to be executed until a handover failure; an indication of whether a time range was sufficient for performing a CHO; an indication of whether the UE detected one or more candidate cells in the time range; or a list of one or more NTN cells detected in the time range.

Clause 56: The method of Clause 54, wherein: the location-based CHO conditions or related parameters comprise at least one of: time spent by the UE in the location range; an indication of whether the UE detected one or more candidate cells in an area; a list of one or more NTN cells detected in the area; time spent by the UE in the area; or at least one of a difference in distance or difference in RSRP observed by the UE that did not meet a configured condition.

Clause 57: The method of Clause 54, wherein: the report indicates one or more CHO trigger conditions and the time difference when different CHO trigger condition that were met.

Clause 58: The method of Clause 48, wherein: the failure comprises a CEF and the report includes at least one of: timestamp and location information, an identifier indicating whether a failed cell is broadcast as a potential target or future cell, an indication whether the failed cell is part of an NTN or TN, or a satellite identifier.

Clause 59: The method of Clause 58, wherein: the network entity receives separate CEF reports for TN cells and NTN cells.

Clause 60: The method of any one of Clauses 47-59, wherein: the report comprises at least one RACH report entry for a RACH procedure for an NTN cell.

Clause 61: The method of Clause 60, wherein: the RACH report entry includes at least one of: an indication of PRACH resources related to a transmission of a first RACH message by the UE for the RACH procedure, a timestamp and location information to indicate when and where the UE performed a RACH procedure, whether the UE used a GNSS assisted TA common TA value for the RACH procedure, or an indication of whether the UE used a random access preamble reserved for UEs supporting GNSS or for UEs not supporting GNSS.

Clause 62: The method of Clause 60, wherein: the RACH report entry includes at least one of: an indication of a LCH identity; a measured RTT value; a UE-specific service link RTT and broadcast RTT compensation value; time and frequency pre-compensation used by the UE for a PUSCH transmission; a measured elevation angle; or a backoff counter length configured at the UE for an initial RACH.

Clause 63: The method of Clause 60, wherein: the RACH report entry include NTN specific RA-purpose: TA report or TA update, if the RACH procedure was initiated for TA update.

Clause 64: The method of any one of Clauses 47-63, wherein: the report comprises at least one CGI report including a satellite identifier corresponding to a CGI.

Clause 65: The method of any one of Clauses 47-64, wherein: the report also includes, for the NTN cell, at least one of: a timestamp, a UE to satellite delay, a TAC, or elevation angle.

Clause 66: The method of Clause 65, wherein: the TAC comprises one of multiple TACs broadcast for a same PCI; and the UE reports at least one of a current CGI based on a serving TAC or multiple CGIs based on the broadcast TACs.

Clause 67: The method of any one of Clauses 47-66, wherein: the report comprises mobility information for the UE in the NTN cell; and the mobility information comprises at least one of a time when the UE connects to the NTN cell, a duration of time spent on the NTN cell, and initial and final location information during cell transitions.

Clause 68: The method of any one of Clauses 47-67, wherein: the report includes UAC reporting information.

Clause 69: The method of Clause 68, wherein: the UAC reporting information comprises at least one of: time information of an access attempt; location information where the access attempt was made; TAC information and at least one of a PCI or a CGI of an access cell; or an access category, satellite identifier, or cell ID.

Clause 70: The method of Clause 68, wherein: the UAC reporting information comprises an indication of whether an access attempt failure results in the reselection to the TN.

Clause 71: A method of wireless communication by a wireless node, comprising: generating at least one data collection report for network cell self-optimization and for QoS verification while the UE is capable of connecting to a network via both TN cells and NTN cells; and transmitting the data collection report.

Clause 72: The method of Clause 71, wherein: the data collection report comprises a MDT report.

Clause 73: The method of Clause 72, wherein: the data collection report comprises a MDT report Containing measurements in IDLE and INACTIVE state that includes at least one of: radio measurements of TN and NTN cells depending upon the UE capability; an indication of whether a camped cell is part of an NTN or TN; a satellite identifier if a capped cell or neighboring cell is part of NTN; or a cell visibility time or cell switch-off time of a particular satellite or frequency or PCID.

Clause 74: The method of Clause 73, wherein: the MDT report additionally include at least one of: an indication of whether camped cells and neighboring cell are visible with timestamps; or a list of TACs.

Clause 75: The method of Clause 72, wherein: the data collection report comprises an MDT report.

Clause 76: The method of Clause 75, wherein: the MDT report indicates, for one or more NTN cells, at least one of: data volume, UE uplink throughput, UE downlink throughput, downlink delay, uplink delay, downlink packet loss, or uplink packet loss.

Clause 77: The method of Clause 76, wherein: the data volume, UE uplink throughput, UE downlink throughput, downlink delay, uplink delay, downlink packet loss, or uplink packet loss are obtained separately based on the information whether the HARQ issue was detected in uplink or downlink, or not.

Clause 78: The method of Clause 75, wherein: the MDT report indicates, for RRM measurement of one or more NTN cells, at least one of: cell and beam level measurements with a satellite identifier or flag to indicate cell and beam measurements correspond to NTN cell, which configured cell or frequency was not detected in a configured master group or with configured MTC window, or how long a physical cell ID or frequency was detected within the configured MTC window.

Clause 79: The method of Clause 75, wherein: the MDT report indicates at least one of: an average, minimum, maximum, median, histogram, or excess propagation delay or differential delay measured by the UE in a measurement period.

Clause 80: The method of Clause 75, wherein: the MDT report indicates at least one HARQ issue for at least one of uplink or downlink, if the HARQ issue is detected more than a threshold number of times.

Clause 81: The method of Clause 80, wherein: the MDT report indicates which HARQ processes were successful.

Clause 82: A processing system, comprising: a memory comprising computer-executable instructions; one or more processors configured to execute the computer-executable instructions and cause the processing system to perform a method in accordance with any one of Clauses 1-81.

Clause 83: A processing system, comprising means for performing a method in accordance with any one of Clauses 1-81.

Clause 84: A non-transitory computer-readable medium comprising computer-executable instructions that, when executed by one or more processors of a processing system, cause the processing system to perform a method in accordance with any one of Clauses 1-81.

Clause 85: A computer program product embodied on a computer-readable storage medium comprising code for performing a method in accordance with any one of Clauses 1-81.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of data collection reporting for NTN networks. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks.

The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications at a user equipment (UE), comprising:
   one or more memories comprising instructions; and
   one or more processors configured to execute the instructions and cause the apparatus to:
      transmit an indication of a capability of the UE, wherein;
         the capability indicates that the UE can transmit one or more minimization of drive test (MDT) or self-organizing network (SON) reports over a terrestrial network (TN), a non-terrestrial network (NTN), or both the TN and the NTN,
         the one or more MDT or SON reports comprise measurements for one or more TN cells, measurements for one or more NTN cells, and an identifier that differentiates the measurements for the one or more NTN cells from the measurements for the one or more TN cells, and
         the capability further indicates the UE is able to report the measurements for the one or more NTN cells via the one or more TN cells and the measurements for the one or more TN cells via the one or more NTN cells; and
      transmit the one or more MDT or SON reports in accordance with the capability.

2. The apparatus of claim 1, wherein when the one or more MDT and SON reports include measurements for both a TN cell and an NTN cell, and wherein the one or more processors are configured to execute the instructions and cause the apparatus to include a satellite identifier or a flag that differentiates the NTN cell from the TN cell in the one or more MDT or SON reports.

3. The apparatus of claim 1, wherein the one or more processors are configured to execute the instructions and cause the apparatus to: receive signaling indicating that the UE is to send the one or more MDT or SON reports via at least one TN cell, via at least one NTN cell, or via at least one TN cell and at least one NTN cell.

4. The apparatus of claim 3, wherein the signaling indicates one or more trigger events for generating the one or more MDT or SON reports when handover between a first NTN cell and a first TN cell is performed.

5. The apparatus of claim 3, wherein the signaling indicates at least one of: that at least one MDT or SON report including TN and NTN cell measurements are to be transmitted via a TN cell.

6. The apparatus of claim 1, wherein the one or more processors are configured to execute the instructions and cause the apparatus to:
   separately generate and store at least a first MDT or SON report and at least a second MDT or SON report; and
   separately indicate availability of the at least the first MDT or SON report for at least one TN cell and the at least the second MDT or SON report for at least one NTN cell.

7. The apparatus of claim 1, wherein the one or more processors are configured to execute the instructions and cause the apparatus to transmit the one or more MDT or SON reports to a trace collection entity (TCE) via a user plane.

8. The apparatus of claim 7, wherein the one or more processors are configured to execute the instructions and cause the apparatus to:
   receive at least one of an internet protocol (IP) address of the TCE or a Uniform Resource Locator (URL) for the TCE; and
   transmit the one or more MDT or SON reports to the IP address or the URL, via at least one of a TN cell, an NTN cell, or a local area network (LAN).

9. The apparatus of claim 1, wherein the one or more processors are configured to execute the instructions and cause the apparatus to: receive one or more configurations for reporting TN and NTN measurements using the one or more SON and MDT reports.

10. The apparatus of claim 9, wherein the one or more configurations include a configuration for reporting over only one or more TN cells or only over one or more NTN cells.

11. A method for wireless communications at a user equipment (UE), comprising:
   transmitting an indication of a capability of the UE, wherein:
      the capability indicates that the UE can transmit one or more minimization of drive test (MDT) or self-organizing network (SON) reports over a terrestrial network (TN), a non-terrestrial network (NTN), or the TN and the NTN,
      the one or more MDT or SON reports comprise measurements for one or more TN cells, measurements for one or more NTN cells, and an identifier that differentiates the measurements for the one or more NTN cells from the measurements for the one or more TN cells, and
      the capability further indicates the UE is able to report the measurements for the one or more NTN cells via the one or more TN cells and the measurements for the one or more TN cells via the one or more NTN cells; and transmitting the one or more MDT or SON reports in accordance with the capability.

12. A method for wireless communications at a network entity, comprising:

receiving, from a user equipment (UE), an indication of a capability of the UE, wherein:

the capability indicates that the UE can transmit one or more minimization of drive test (MDT) or self-organizing network (SON) reports over a terrestrial network (TN), a non-terrestrial network (NTN), or the TN and the NTN, the one or more MDT or SON reports comprise measurements for one or more TN cells, measurements for one or more NTN cells, and an identifier that differentiates the measurements for the one or more NTN cells from the measurements for the one or more TN cells, and the capability further indicates the UE is able to report the measurements for the one or more NTN cells via the one or more TN cells and the measurements for the one or more TN cells via the one or more NTN cells; and receiving one or more MDT or SON reports from the UE in accordance with the capability.

13. An apparatus for wireless communications at a network entity, comprising:

one or more memories comprising instructions; and one or more processors configured to execute the instructions and cause the apparatus to:

receive, from a user equipment (UE), an indication of a capability of the UE, wherein:

the capability indicates that the UE can transmit one or more minimization of drive test (MDT) or self-organizing network (SON) reports over a terrestrial network (TN), a non-terrestrial network (NTN), or the TN and the NTN, the one or more MDT or SON reports comprise measurements for one or more TN cells, measurements for one more NTN cells, and an identifier that differentiates the measurements for the one or more NTN cells from the measurements for the one or more TN cells, and the capability further indicates the UE is able to report the measurements for the one or more NTN cells via the one or more TN cells and the measurements for the one or more TN cells via the one or more NTN cells; and receive one or more MDT or SON reports from the UE in accordance with the capability.

* * * * *